US012291916B2

(12) United States Patent
Tien

(10) Patent No.: US 12,291,916 B2
(45) Date of Patent: May 6, 2025

(54) EASY-TO-INSTALL DOOR OPENER

(71) Applicant: I-TEK METAL MFG. CO., LTD, Tainan (TW)

(72) Inventor: Hung-Jen Tien, Tainan (TW)

(73) Assignee: I-TEK METAL MFG. CO., LTD, Tainan (TW)

( * ) Notice: Subject to any disclaimer, the term of this patent is extended or adjusted under 35 U.S.C. 154(b) by 719 days.

(21) Appl. No.: 17/503,531

(22) Filed: Oct. 18, 2021

(65) Prior Publication Data

US 2023/0104006 A1 Apr. 6, 2023

(51) Int. Cl.
*E05F 15/63* (2015.01)
*E05F 3/22* (2006.01)

(52) U.S. Cl.
CPC .............. *E05F 15/63* (2015.01); *E05F 3/227* (2013.01); *E05F 2003/228* (2013.01); *E05F 2015/631* (2015.01); *E05Y 2201/434* (2013.01); *E05Y 2900/132* (2013.01)

(58) Field of Classification Search
CPC ..... E05F 15/63; E05F 2015/631; E05F 3/227; E05F 3/224
See application file for complete search history.

(56) References Cited

U.S. PATENT DOCUMENTS 4,179,092 A * 12/1979 Miyazawa .............. E05F 3/227 16/49
5,135,415 A * 8/1992 Huber .................. H01R 9/2608 439/716
6,125,505 A * 10/2000 Jensen .................... E05F 3/227 16/DIG. 40
6,138,968 A * 10/2000 Svantesson ............ H02B 1/052 248/220.22
6,177,771 B1 1/2001 Kinzer et al.
6,609,679 B1 * 8/2003 Seidel ....................... F16B 2/14 361/747
6,634,140 B1 10/2003 Sellman
6,786,006 B2 9/2004 Kowalczyk et al.
6,891,479 B1 5/2005 Eccleston
7,051,403 B2 5/2006 Homberg
7,061,197 B1 6/2006 Mullet et al.
7,068,179 B2 6/2006 Snell et al.
7,143,547 B2 12/2006 Liles, Jr.
7,234,201 B2 6/2007 Brown et al.
7,282,883 B2 10/2007 Mullet et al.
(Continued)

*Primary Examiner* — Gregory J Strimbu
(74) *Attorney, Agent, or Firm* — Ying-Ting Chen; Law Office of Michael Chen

(57) ABSTRACT

A door opener includes a mount seat having a bottom wall. A reinforcing seat is fixed to the bottom wall. A driving device for opening or closing the door is detachably coupled to the reinforcing seat and includes a motor. A quick-release device includes a quick-release seat fixed to the bottom wall, a first coupling portion, a movable member slidably coupled to the quick-release seat and a movable coupling portion. A control device includes a protective housing and a control panel coupled to the protective housing. The protective housing is detachably coupled with the first coupling portion and the movable coupling portion. The driving device is selectively mounted to make the motor face or face away from the control device. An outer cover covers the driving device and the control device and includes a window in which the control panel is located.

12 Claims, 27 Drawing Sheets

(56) References Cited

U.S. PATENT DOCUMENTS

| | | | |
|---|---|---|---|
| 7,296,380 | B2 | 11/2007 | Backman |
| 7,316,096 | B2 | 1/2008 | Houser et al. |
| 7,418,800 | B1 | 9/2008 | Sellman |
| 7,484,333 | B2 | 2/2009 | Houser et al. |
| 7,555,867 | B2 | 7/2009 | Liles, Jr. |
| 7,717,155 | B2 | 5/2010 | Mullet |
| 7,774,984 | B2 | 8/2010 | Hsu |
| 7,966,771 | B2 | 6/2011 | Bienek |
| 8,109,038 | B2 | 2/2012 | Houser et al. |
| 8,169,169 | B2 | 5/2012 | Hass et al. |
| 8,248,005 | B2 | 8/2012 | Romer |
| 8,390,219 | B2 | 3/2013 | Houser |
| 8,393,054 | B2 | 3/2013 | Bienek |
| 8,407,937 | B2 | 4/2013 | Houser |
| 8,415,902 | B2 | 4/2013 | Burris et al. |
| 8,434,268 | B2 | 5/2013 | Nixon |
| 8,499,495 | B2 | 8/2013 | Houser et al. |
| 8,547,046 | B2 | 10/2013 | Burris et al. |
| 8,601,744 | B2 | 12/2013 | Wildforster et al. |
| 8,695,277 | B2 | 4/2014 | Romer et al. |
| 8,826,598 | B2 | 9/2014 | Ranaudo et al. |
| 8,875,344 | B2 | 11/2014 | Salutzki et al. |
| 8,904,710 | B2 | 12/2014 | Romer et al. |
| 8,963,683 | B2 | 2/2015 | Romer |
| 9,003,630 | B2 | 4/2015 | Hufen |
| 9,045,927 | B1 | 6/2015 | Hoffberg |
| 9,097,051 | B2 | 8/2015 | Hellwig |
| 9,115,526 | B2 | 8/2015 | Houser et al. |
| 9,121,217 | B1 | 9/2015 | Hoffberg |
| 9,163,446 | B2 | 10/2015 | Houser et al. |
| 9,181,744 | B2 | 11/2015 | Salutzki et al. |
| 9,187,942 | B2 | 11/2015 | Wildforster |
| 9,297,194 | B2 | 3/2016 | Bienek et al. |
| 9,506,284 | B2 | 11/2016 | Braverman et al. |
| 9,514,583 | B2 | 12/2016 | Zasowski et al. |
| 9,631,412 | B2 | 4/2017 | Hellwig et al. |
| 9,683,378 | B2 | 6/2017 | Houser et al. |
| 9,695,620 | B2 | 7/2017 | Zasowski et al. |
| 9,869,117 | B2 | 1/2018 | Houser et al. |
| 9,995,076 | B1 | 6/2018 | Hoffberg |
| 10,006,236 | B2 | 6/2018 | Hellwig et al. |
| 10,024,094 | B2 | 7/2018 | Bell et al. |
| 10,030,425 | B2 | 7/2018 | Zasowski et al. |
| 10,030,426 | B2 | 7/2018 | Langenberg |
| 10,077,591 | B2 | 9/2018 | Hass |
| 10,180,023 | B2 | 1/2019 | Zasowski et al. |
| 10,208,520 | B2 | 2/2019 | Long et al. |
| 10,236,801 | B2 | 3/2019 | Dye et al. |
| 10,253,540 | B2 | 4/2019 | Bell et al. |
| 10,280,670 | B2 | 5/2019 | Roberts |
| 10,280,678 | B1 | 5/2019 | Rendon, Jr. et al. |
| 10,304,272 | B2 | 5/2019 | Kvinge et al. |
| 10,344,502 | B2 | 7/2019 | McKibben et al. |
| 10,415,301 | B2 | 9/2019 | Kuan |
| 10,472,873 | B2 | 11/2019 | Ladha et al. |
| 10,559,151 | B2 | 2/2020 | Kvinge et al. |
| 10,704,310 | B1 | 7/2020 | Barbon et al. |
| 10,704,313 | B2 | 7/2020 | Houser et al. |
| 10,724,288 | B2 | 7/2020 | Baumgarte |
| 11,417,200 | B2 * | 8/2022 | Hass ........................ E05F 15/77 |
| 11,629,544 | B1 * | 4/2023 | Tien ........................ E05F 15/63 49/70 |
| 11,795,751 | B2 * | 10/2023 | Tien ........................ E05F 3/102 |
| 11,828,097 | B1 * | 11/2023 | Tien ........................ E05F 1/105 |
| 11,834,889 | B2 * | 12/2023 | Tien ........................ E05F 15/63 |
| 11,851,935 | B1 * | 12/2023 | Tien ........................ E05F 15/63 |
| 12,049,782 | B2 * | 7/2024 | Hellwig .................... E05D 5/02 |
| 2007/0256362 | A1 | 11/2007 | Hansen |
| 2009/0045234 | A1 * | 2/2009 | Carnevali ............... H04M 1/04 224/199 |
| 2013/0009785 | A1 | 1/2013 | Finn et al. |
| 2015/0262438 | A1 * | 9/2015 | Zasowski .............. G06F 3/0482 49/506 |
| 2016/0348415 | A1 | 12/2016 | Baumgarte |
| 2018/0334841 | A1 | 11/2018 | Langenberg et al. |
| 2019/0043296 | A1 | 2/2019 | Baumgarte et al. |
| 2019/0145138 | A1 | 5/2019 | Eickhoff |
| 2019/0153764 | A1 | 5/2019 | Baumgarte |
| 2019/0264486 | A1 | 8/2019 | Toloday et al. |
| 2019/0319557 | A1 | 10/2019 | Dye et al. |
| 2019/0338576 | A1 | 11/2019 | Wang |
| 2019/0345738 | A1 | 11/2019 | McKibben et al. |
| 2019/0383080 | A1 | 12/2019 | Barbon et al. |
| 2020/0190885 | A1 | 6/2020 | Coleman |
| 2020/0256108 | A1 | 8/2020 | Shetty et al. |
| 2020/0300026 | A1 * | 9/2020 | Lawhon .................. E05F 15/70 |
| 2023/0133080 | A1 * | 5/2023 | Tien ........................ E05F 1/105 49/70 |

* cited by examiner

EASY-TO-INSTALL DOOR OPENER

BACKGROUND OF THE INVENTION

The present invention relates to an easy-to-install door opener and, more particularly, to a door opener that automatically controls pivotal opening or pivotal closing of a door.

An electric door opener currently available on the market is mounted on a door frame to which a door is mounted to pivot between an open position and a closed position. The electric door opener is used to automatically control opening or closing of the door. The electric door opener generally relies on a driving device (having a motor and a plurality of gear mechanisms) cooperating with a linkage to push open or close the door. Since the movement direction of the motor, the gear mechanisms, and the linkage is fixed after cooperation between the components, the assembling direction of the driving device is correlated to the type of the door (left-handed or right-handed) and which side of the door the electric door opener is mounted. Furthermore, the assembling direction of a control device of the electric door opener for controlling the driving device is also correlated to the side of the door to which the electric door opener is mounted.

In currently available approaches, the driving device and the control device are directly mounted by screws to a mounting seat of the electric door opener. However, the driving device and the control device have certain weights, and the electric door opener is mounted to a position where a normal person cannot touch without reaching out his or her hands, which is inconvenient to installation.

BRIEF SUMMARY OF THE INVENTION

In view of the above drawbacks, the present invention provides a door opener including:

a mount seat including a bottom wall;

a reinforcing seat fixed to the bottom wall and including a plurality of coupling pegs protruding from an outer face thereof;

a driving device including a motor, wherein the driving device includes a plurality of lugs detachably coupled with the plurality of coupling pegs, wherein the driving device is configured to be operatively connected to a door for moving the door between an open position and a closed position;

a quick-release device including a quick-release seat fixed to the bottom wall, wherein the quick-release seat includes a first coupling portion, wherein the quick-release device further includes a movable member slidably coupled to the quick-release seat and slidable in a lateral direction, and wherein the movable member includes a movable coupling portion;

a control device including a protective housing and a control panel coupled to the protective housing, wherein the protective housing is detachably coupled with the first coupling portion and the movable coupling portion of the quick-release device, wherein the driving device is selectively mounted to make the motor face or face away from the control device; and an outer cover covering an outer side of the driving device and an outer side of the control device, wherein the outer cover includes a window, and wherein the control panel of the control device is located in the window.

The reinforcing seat abuts against and is securely screwed to the bottom wall of the mounting seat to increase the structural strength, such that the mounting seat is less likely to distort and deform even though a heavier driving device is disposed. Furthermore, the reinforcing seat and the mounting seat are in threading connection with the frame by screws, providing the mounting seat with excellent strength.

In an example, the door opener further includes a supporting device having a lining and a supporting member. The supporting member includes a first threaded portion and a second threaded portion. The supporting device further includes a fastener. The first threaded portion of the supporting member is in threading connection with lining. The fastener extends through the reinforcing seat and is in threading connection with the second threaded portion of the supporting member. When the supporting member rotates relative to the lining, the supporting member moves towards or away from the bottom wall. When the fastener rotates while the supporting and the lining do not rotate, the lining moves towards the bottom wall.

Each supporting device is mounted in the gap between the mounting seat and the frame to reinforce the overall strength of the door opener installed on the frame. Furthermore, the lining and the supporting member of each supporting device can be rotated to adjust the length, so as to be applicable to frames of various sizes and shapes, thereby increasing the coupling strength between the door opener and the frame.

In an example, the lining includes a screw hole. The first threaded portion of the supporting member has an outer threading in threading connection with the screw hole. The second threaded portion is an inner threading.

In an example, the quick-release seat further includes an assembling portion opposite to the first coupling portion in the lateral direction. The assembling portion includes a sliding groove. The movable member includes an ear. The movable member is slidably coupled with the assembling portion. The ear is received in the sliding groove. A biasing spring is disposed between the ear and an end wall of the sliding groove. The biasing spring biases the movable member towards the first coupling portion.

In an example, the protective housing of the control device includes two lateral sides. A first side coupling groove and a second side coupling groove are disposed on the two lateral sides, respectively. The first coupling portion is selectively coupled with one of the first and second side coupling grooves. The movable coupling portion is selectively coupled with another of the first and second side coupling grooves.

In an example, the door opener further includes:

a first side cover, wherein the mounting seat further includes two ends spaced from each other in the lateral direction, and wherein the first side cover is fixed to one of the two ends of the mounting seat;

a second side cover fixed to another of the two ends of the mounting seat wherein the outer cover is located between the first and second side covers; and a mode switching device fixed to the first side cover and in electrical connection with the control device, wherein the mode switching device includes an anti-theft control module and a switching module operable by the anti-theft control module and configured to wake up the control device, wherein when the anti-theft control module is locked, the anti-theft control module is incapable of operating the switching module, and wherein only when the anti-theft control module is unlocked, the anti-theft control module is capable of controlling the switching module to wake up the control device into an operable state.

In an example, the driving device further includes:

a casing to which the motor is coupled;

a first transmission member rotatable mounted to the casing, wherein the motor is configured to drive the first transmission member to rotate; and a manual return module coupled to the casing, wherein the manual return module is operably connected to the first transmission member, wherein the manual return module includes a return spring, wherein the casing is located between the manual return module and the motor in the lateral direction, wherein the driving device is selectively to be mounted in a first mode in which the manual return module is located between the motor and the first side cover in the lateral direction or a second mode in which the manual return module is located between the motor and the second side cover in the lateral direction, and wherein the return spring is configured to push the door to pivot from the open position to the closed position.

In an example, the manual return module includes a sliding member slidably coupled with the casing, wherein rotation of the first transmission member causes the sliding member to move in the lateral direction, wherein the manual return module further includes a connecting rod coupled to the sliding member to move jointly, wherein the connecting rod includes a threaded section, wherein the return spring is mounted around the connecting rod and is not movable in the lateral direction, wherein the manual return module further includes an adjusting ring in threading connection with the threaded section of the connecting rod and located outside of the casing, wherein when the first transmission member does not rotate, rotation of the adjusting ring causes movement of the adjusting ring in the lateral direction to change an extent of pre-compression of the return spring, wherein when the first transmission member rotates in a first direction, the connecting rod and the adjusting ring together move in the lateral direction towards the first transmission member, and the return spring is compressed, and wherein when the first transmission member rotates in a second direction reverse to the first direction, the connecting rod and the adjusting ring together move in the lateral direction away from the first transmission member, and the return spring restores its length.

In an example, the plurality of coupling pegs and the plurality of lugs are arranged to be symmetric in a vertical direction and a left/right direction.

In another aspect of the present invention, a door opener includes:

a mounting seat including a bottom wall;

a reinforcing seat fixed to the bottom wall and including a plurality of coupling pegs protruding from an outer face thereof;

a driving device including a motor, wherein the driving device includes a plurality of lugs detachably coupled with the plurality of coupling pegs, wherein the driving device is configured to be operatively connected to a door for moving the door between an open position and a closed position; and a supporting device including a lining and a supporting member, wherein the supporting member includes a first threaded portion and a second threaded portion, wherein the supporting device further includes a fastener, wherein the first threaded portion of the supporting member is in threading connection with lining, wherein the fastener extends through the reinforcing seat and is in threading connection with the second threaded portion of the supporting member, wherein when the supporting member rotates relative to the lining, the supporting member moves towards or away from the bottom wall, wherein when the fastener rotates while the supporting and the lining do not rotate, the lining moves towards the bottom wall.

In a further aspect of the present invention, a door opener includes:

a mount seat including a bottom wall;

a driving device including a motor, w wherein the driving device is configured to be operatively connected to a door for moving the door between an open position and a closed position;

a quick-release device including a quick-release seat fixed to the bottom wall, wherein the quick-release seat includes a first coupling portion, wherein the quick-release device further includes a movable member slidably coupled to the quick-release seat and slidable in a lateral direction, and wherein the movable member includes a movable coupling portion;

a control device electrically connected to the driving device, wherein the control device includes a protective housing and a control panel coupled to the protective housing, wherein the protective housing is detachably coupled with the first coupling portion and the movable coupling portion of the quick-release device.

The present invention will become clearer in light of the following detailed description of illustrative embodiments of this invention described in connection with the drawings.

Figure 1:
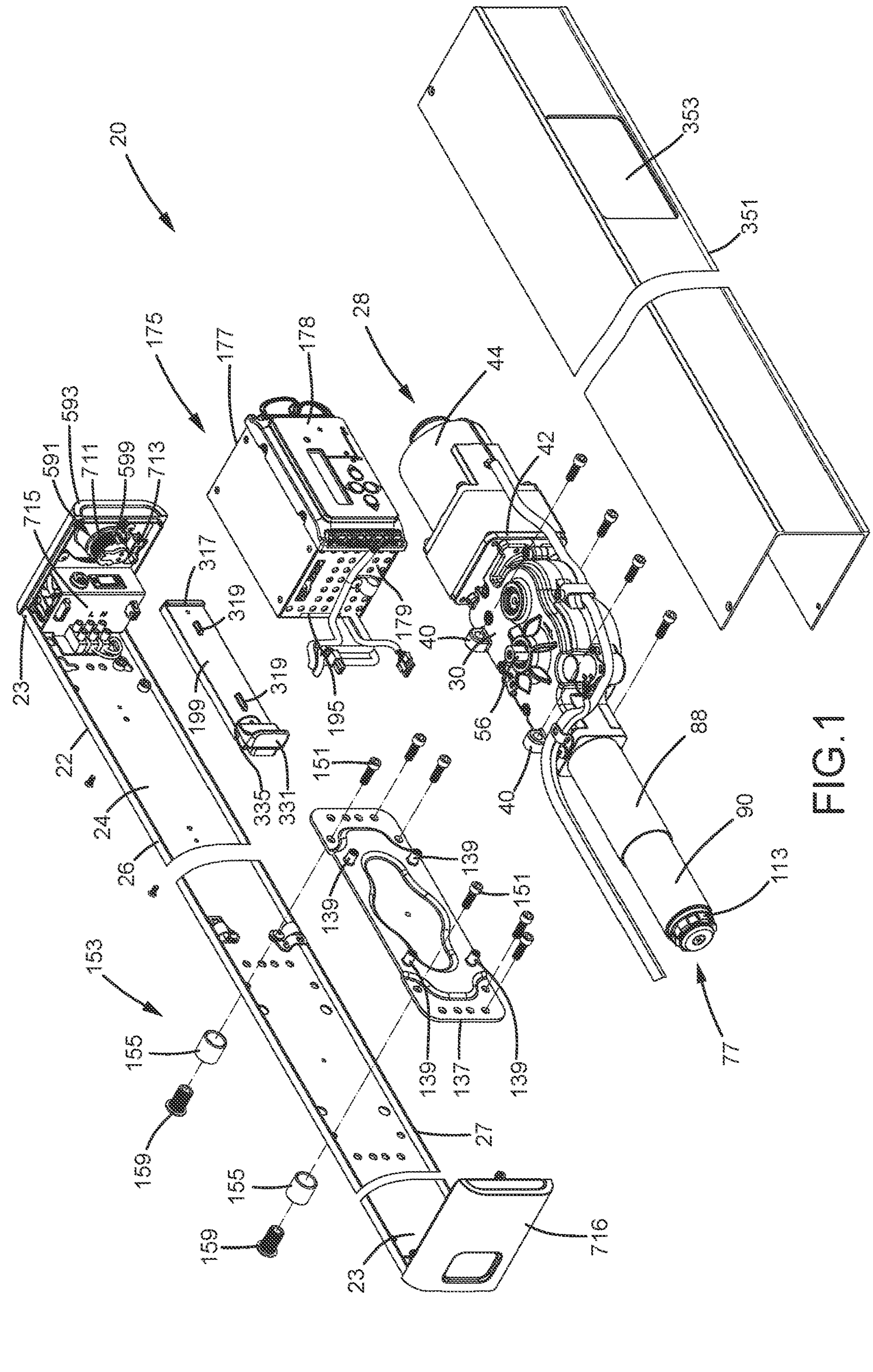
FIG. 1 is an exploded, perspective view of a door opener of an embodiment according to the present invention.
Figure 2:
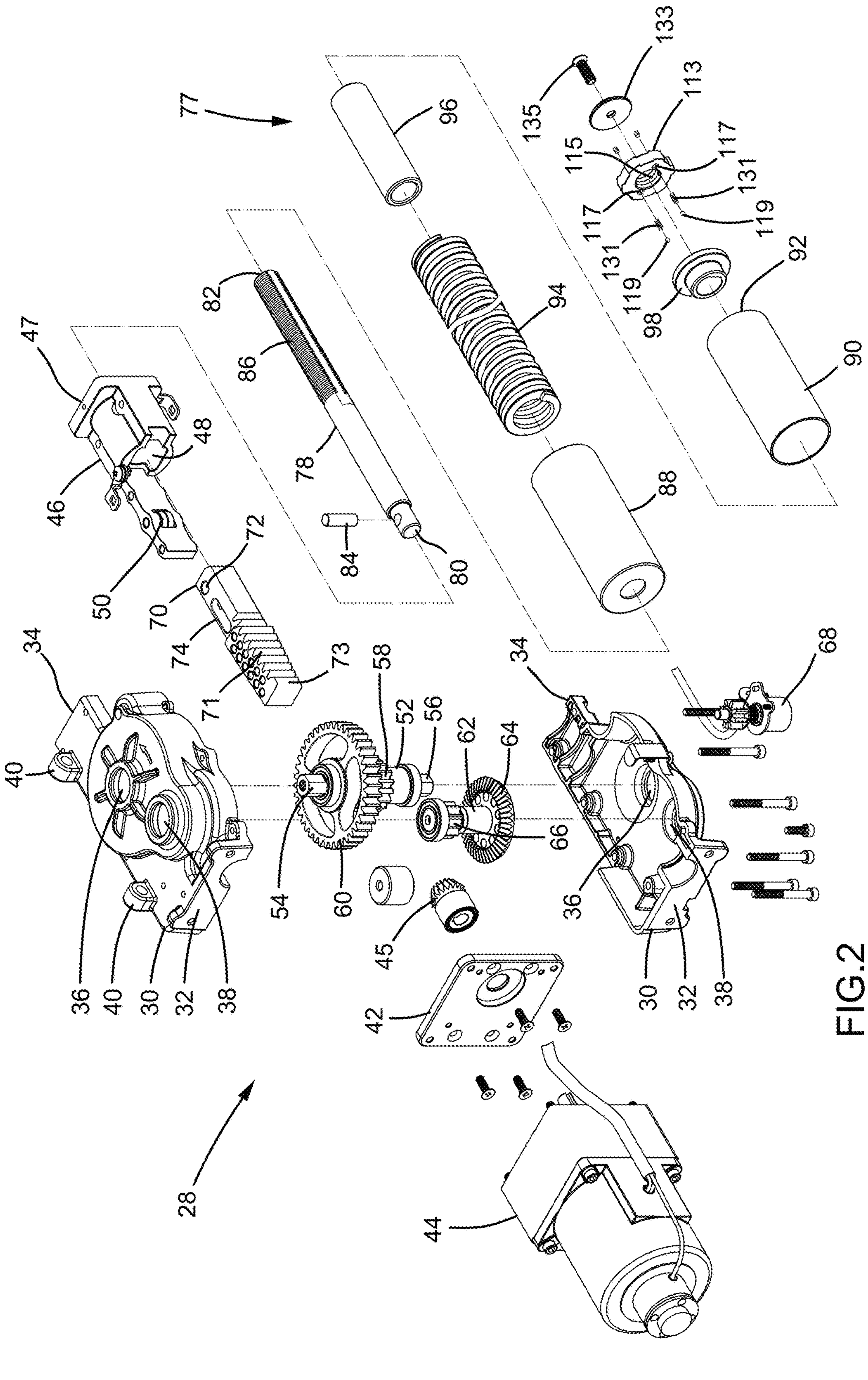
FIG. 2 is an exploded, perspective view of a driving device of the door opener of FIG. 1.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "inner", "outer", "side", "end", "portion", "section", "axial", "lateral", "vertical", "spacing", "length", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 6:
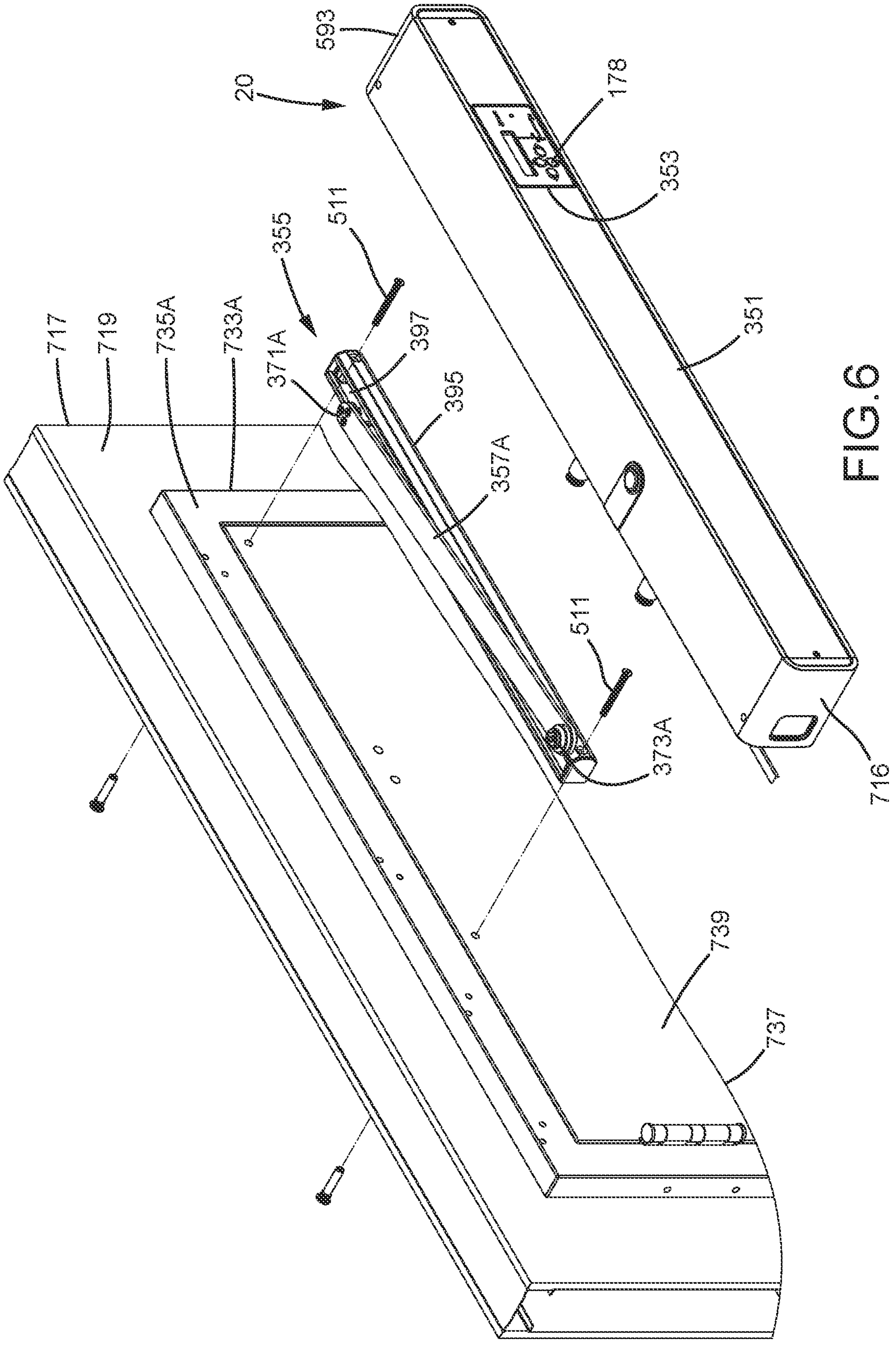
FIG. 6 is an exploded, perspective view of a first linkage and the door opener of FIG. 1.
Figure 13:
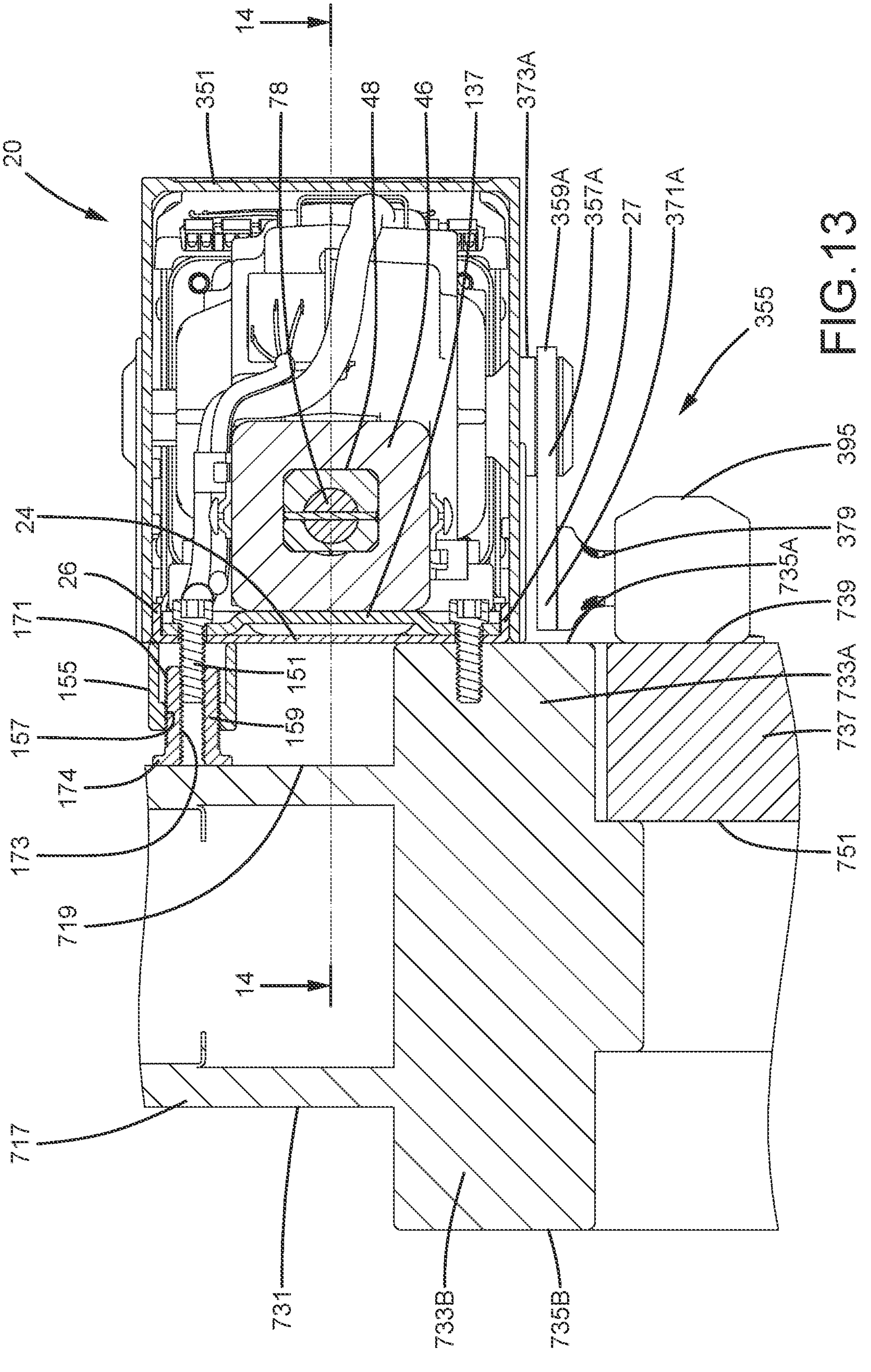
FIG. 13 is a cross sectional view taken along section line 13-13 of FIG. 12.

The present invention relates to an easy-to-install door opener mounted to an outer side of a door frame for opening and closing a door. The door opener provides power for pushing the door. With reference to FIGS. 6 and 13, the door opener 20 is mounted to a frame 717 including a first side 719 and a second side 731 parallel to and spaced from the first side 719. The frame 717 further includes a first protrusive portion 733A on the first side 719 and a second protrusive portion 733B on the second side 731. The first protrusive portion 733A includes a first protrusive wall 735A on an outer side of the first side 719. The second protrusive portion 733B includes a second protrusive wall 735B on an outer side of the second side 731. The first protrusive portion 733A is pivotably connected to a door 737. The door 737 includes a first surface 739 and a second surface 751 parallel to and spaced from the first surface 739. The first surface 739 and the first side 719 are on the same side. The second surface 751 and the second surface 731 are on the same side. The first surface 739 is substantially aligned with the first protrusive wall 735A. The second surface 751 is located between the second side 731 and the first surface 739.

Figure 3:
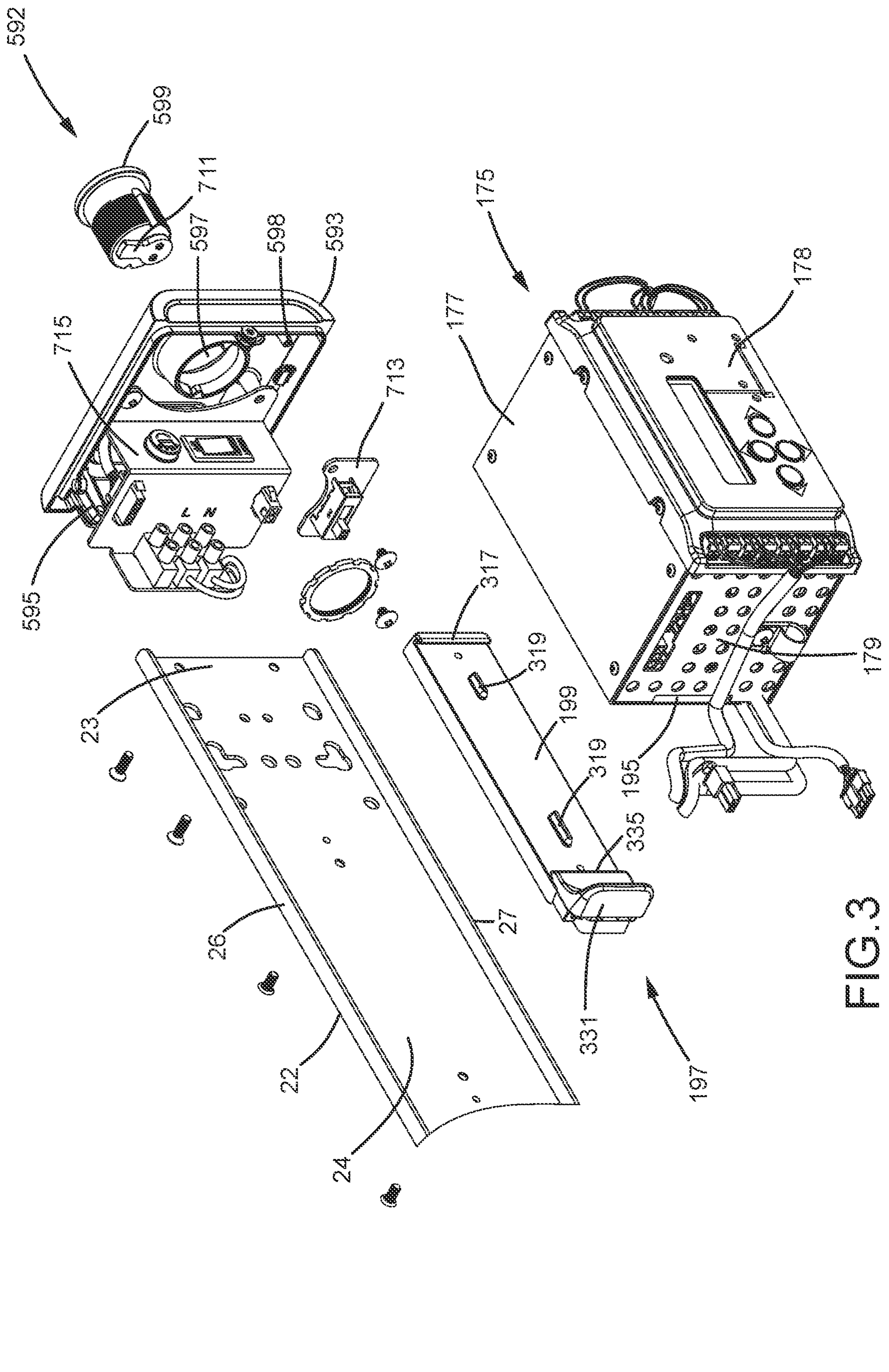
FIG. 3 is an exploded, perspective view of a mode switching device of the door opener of FIG. 1.
Figure 4:
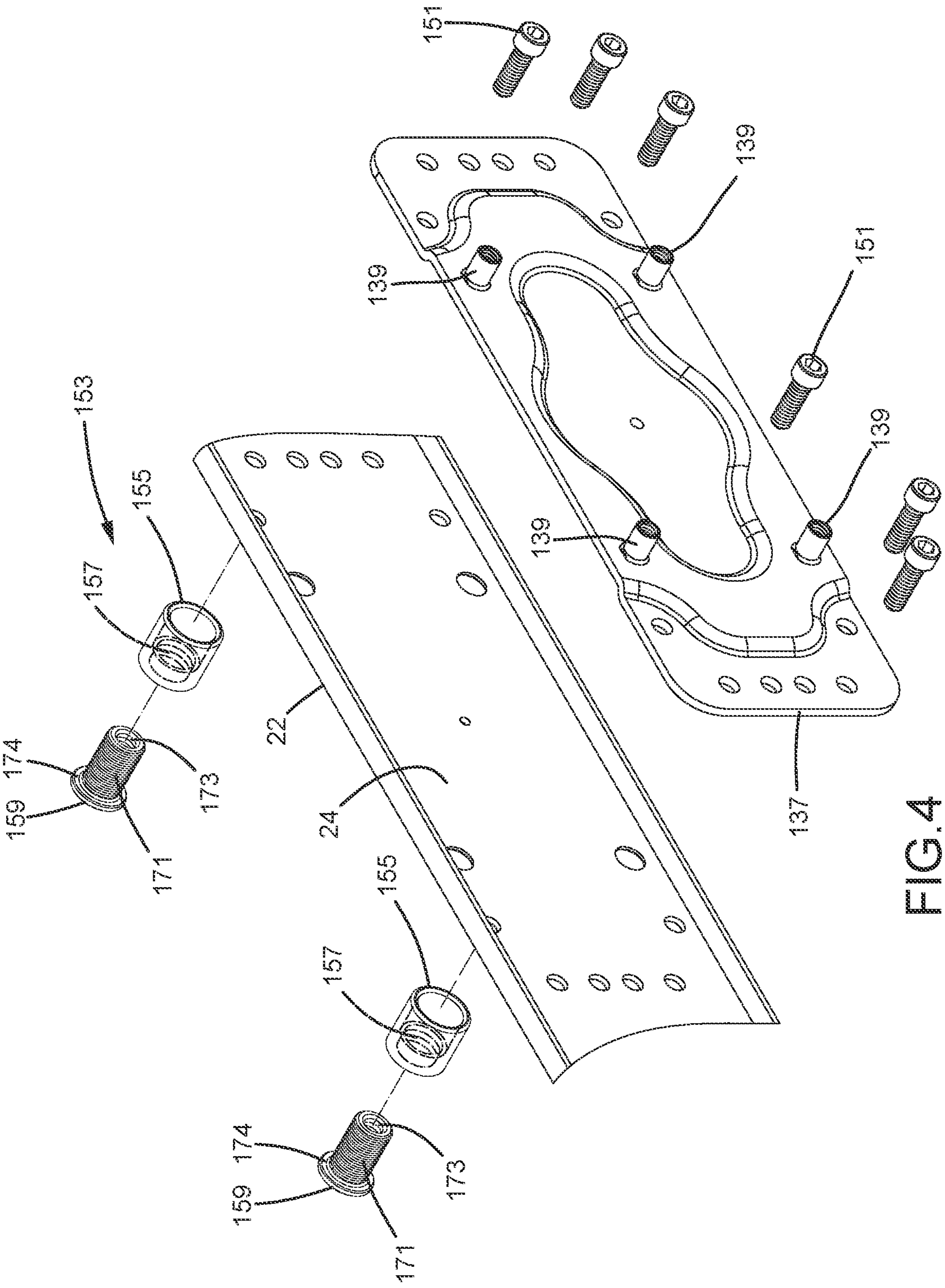
FIG. 4 is an exploded, perspective view of a mounting seat, a reinforcing seat, and a supporting device of the door opener of FIG. 1.
Figure 5:
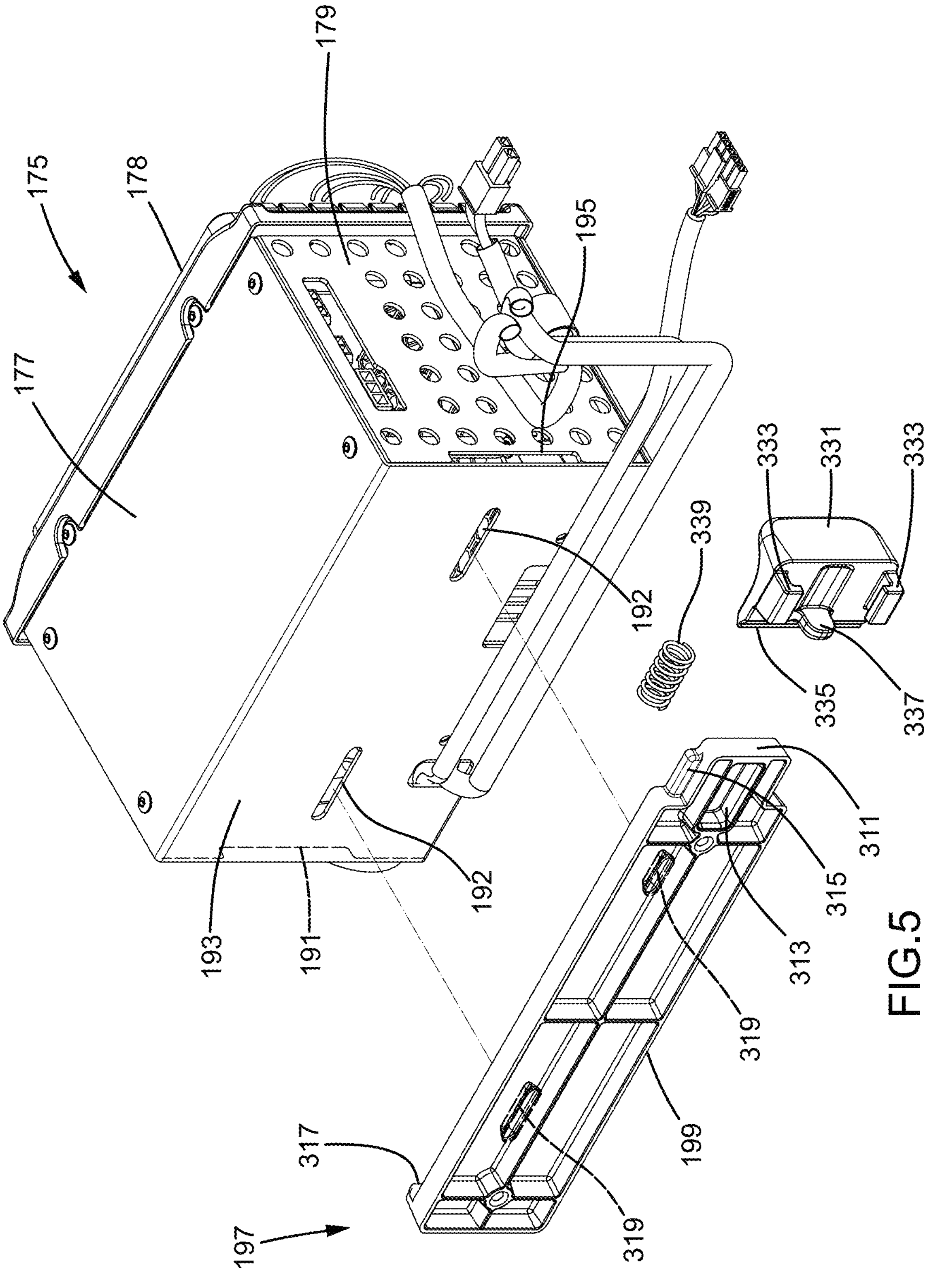
FIG. 5 is an exploded, perspective view of a quick-release device and a control device of the door opener of FIG. 1.

With reference to FIGS. 1 and 3, the door opener 20 includes a mounting seat 22 extending in a lateral direction. The mounting seat 22 has two ends 23 spaced from each other in the lateral direction. The mounting seat 22 further includes a bottom wall 24 extending between the two ends 23 and an upper edge 26 and a lower edge 27, with each of the upper and lower edges 26 and 27 extending between the two ends 23 and extending perpendicular to the bottom wall 24. The mounting seat 22 can be secured to the frame 717 by screws and can be optionally mounted on the first protrusive portion 733A or the second protrusive portion 733B. In the embodiment show in FIGS. 1-19, the mounting seat 22 is mounted on the first protrusive wall 735A of the first protrusive portion 733A.

With reference to FIGS. 1, 3, 9, and 10, the door opener 20 further includes first and second side covers 593 and 716 mounted to the mounting seat 22. The first side cover 593 includes a first mounting portion 597 having three coaxial holes having different inner diameters. The first mounting portion 597 is stepped in cross section. The first side cover 593 further includes a second mounting portion 598 on an outer side of and adjacent to the first mounting portion 597. The second mounting portion 598 can be in the form of a peg with a screw hole. The first side cover 593 includes a fixing portion 595 on a bottom end thereof. The second side cover 716 also includes a fixing portion (not shown).

The first side cover 593 and the second side cover 716 are mounted to two sides of the mounting seat 22, respectively. As shown in FIGS. 1 and 3, the first side cover 593 is mounted to one of the two ends 23 of the mounting seat 22 by two screws extending through the fixing portion 595 and is substantially perpendicular to the bottom wall 24. The second side cover 716 is mounted to another end 23 of the mounting seat 22 in a way similar to the first side cover 593.

Figure 9:
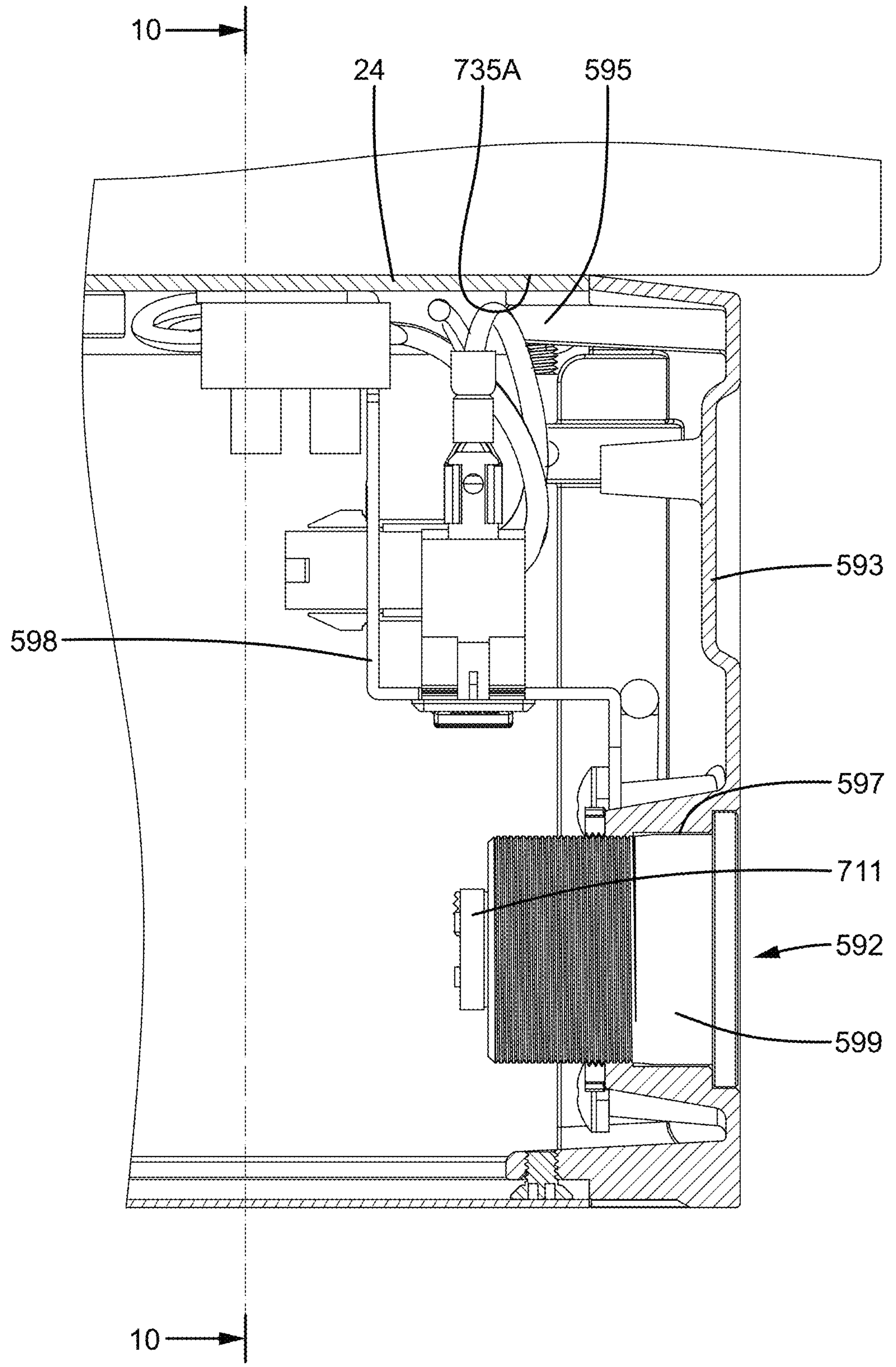
FIG. 9 is a portion of a cross sectional view taken along section line 9-9 of FIG. 8, illustrating the mode switching device.
Figure 10:
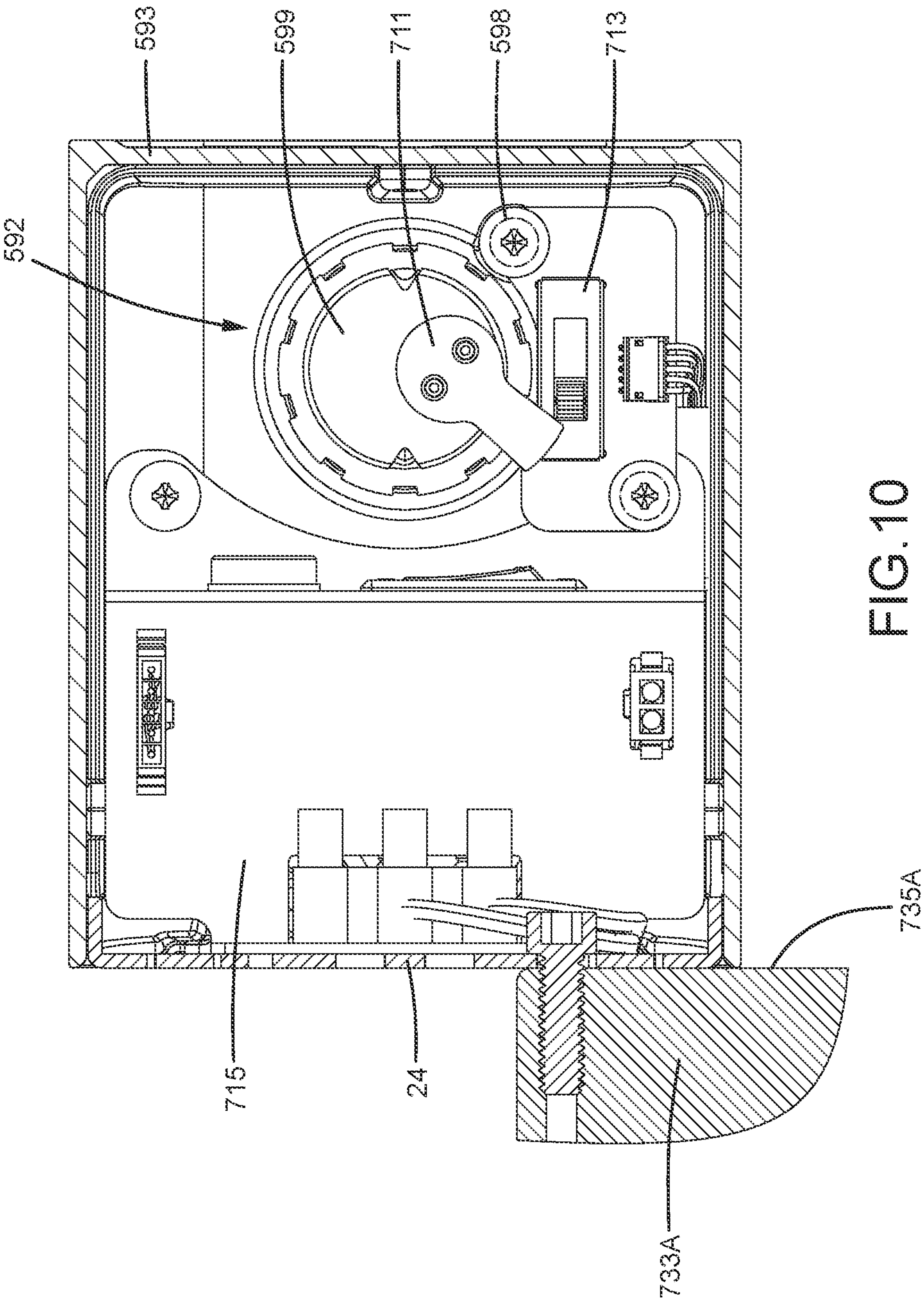
FIG. 10 is a cross sectional view taken along section line 10-10 of FIG. 9.
Figure 11:
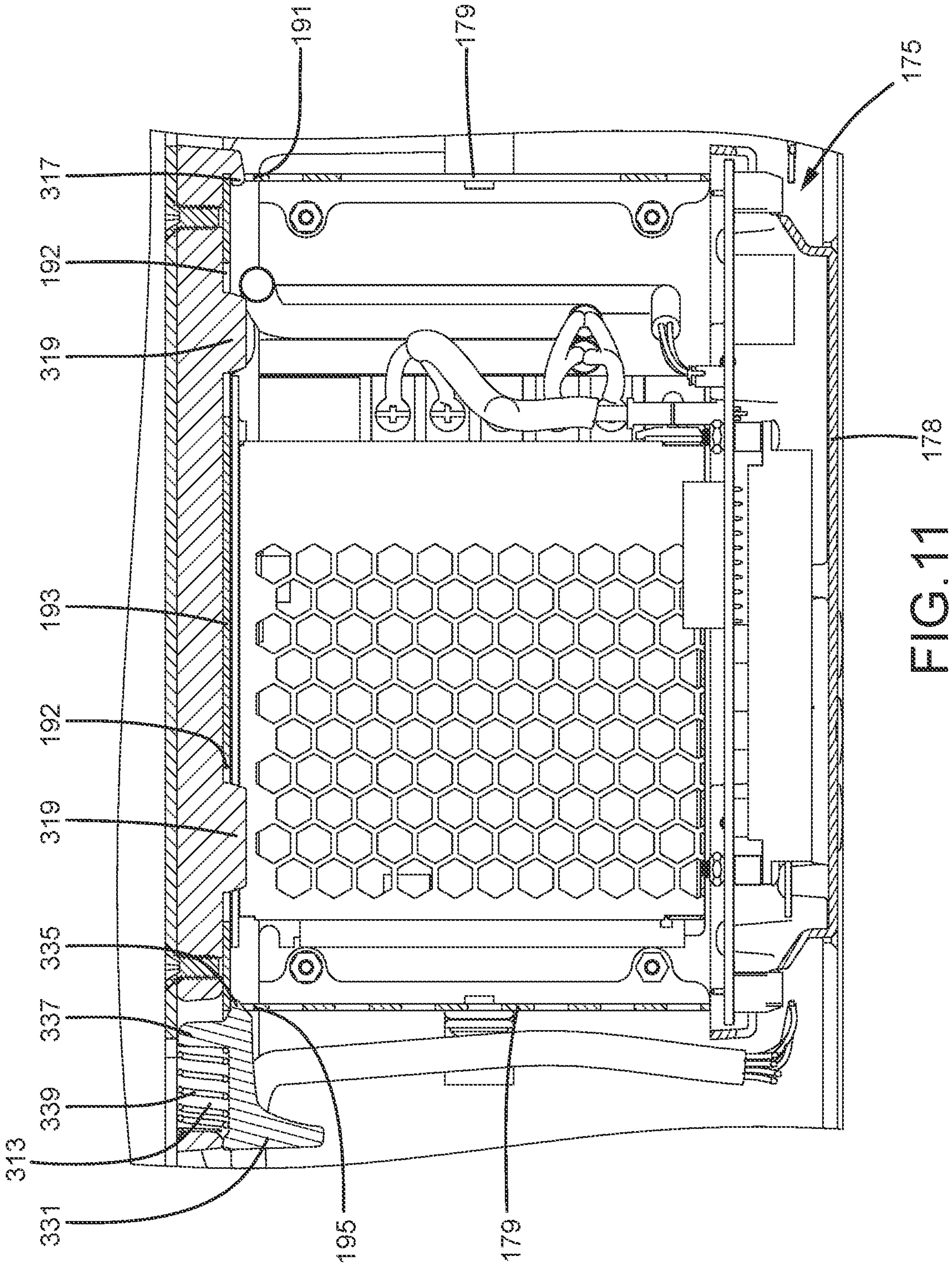
FIG. 11 is another portion of the cross sectional view taken along section line 9-9 of FIG. 8, illustrating the control device and the quick-release device.
Figure 12:
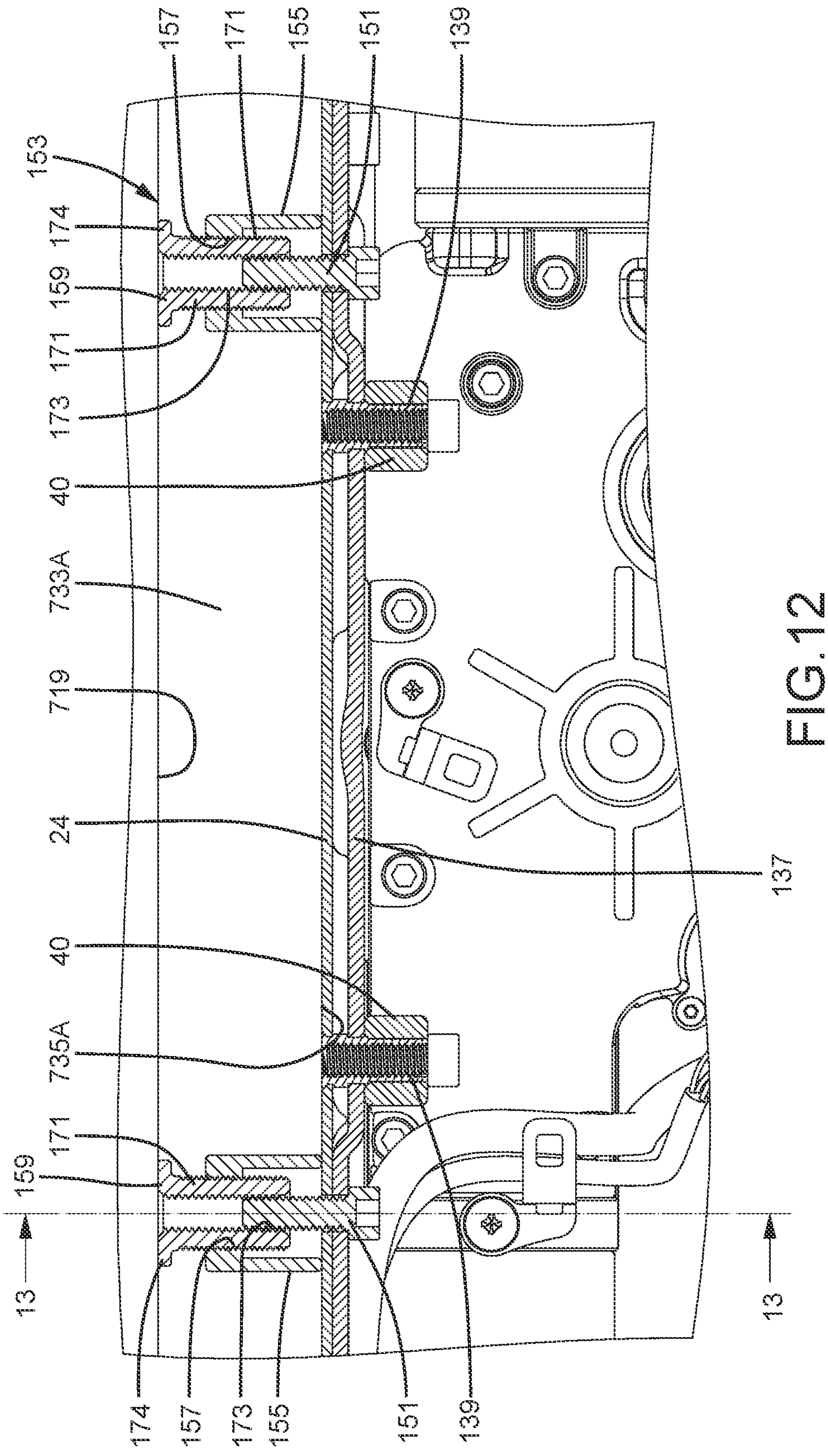
FIG. 12 is a cross sectional view taken along section line 12-12 of FIG. 8.

With reference to FIGS. 3, 9, and 10, a mode switching device 592 is disposed on the first side cover 593 and includes an anti-theft control module 599 fixed to the first mounting portion 597 and a switching module 713 fixed on the second mounting portion 598. The mode switching device 592 further includes a control module 715 fixed in the first side cover 593. The anti-theft control module 599 may have many options. In the form shown, the anti-theft control module 599 is a lock cylinder that can be operated only after unlocking by a metal key. The anti-theft control module 599 in the form of a lock cylinder includes a pivotable actuating piece 711 on an outer side of the lock cylinder.

The switching module 713 cooperates with the anti-theft control module 599 in the form of a lock cylinder to achieve the switching function of the switching module 713 through physical displacement. As shown in FIG. 10, the actuating piece 711 is adjacent to the switching module 713. When a key is used to unlock the anti-theft control module 599 in the form of a lock cylinder, the actuating piece 711 pushes the switching module 713 to switch the operation mode of the door opener 20. Note that the physical displacement achieving the switching function of the switching module 713 includes four positions corresponding to four different modes, respectively. In an embodiment, the four positions of the switching module 713 corresponds to a non-conductive (OFF) mode, a conductive (ON) mode, a wake-up (W/U) mode, and a hold open (H/O) mode.

Alternatively, the anti-theft control module 599 can be a mechanism other than a lock cylinder. For example, the anti-theft control module 599 can be a Bluetooth control module. The switching module 713 is an electric programmable control unit. For example, after a smart mobile device of a user is connected to the anti-theft control module 599 in the form of a Bluetooth control module (the anti-theft control module 599 is unlocked), the switching module 713 in the form of an electric programmable control unit controls switching of the mode of the door opener 20. Accordingly, it can be appreciated that the anti-theft control module 599 can also be comprised of a remote control module.

It is noted that unlocking refers to the anti-theft control module 599 in a state in connection with a Bluetooth device when the anti-theft control module 599 is a Bluetooth control module. Alternatively, in a case that the anti-theft control module 599 is a remote control module, unlocking refers to the anti-theft control module 599 in a state capable of receiving a signal.

With reference to FIGS. 1, 3, 5, and 11, the door opener 20 further includes a quick-release device 197 fixed to the mounting seat 22 and a control device 175 detachably coupled to the quick-release device 197. The control device 175 is in electrical connection with the control module 715. The quick-release device 197 includes a quick-release seat 199. The quick-release device 197 includes a first coupling portion 317 on an end thereof and a first assembling portion 311 opposite to the first coupling portion 317. The first assembling portion 311 includes a sliding groove 313 in a central portion thereof and extending in a lateral direction and two protrusions 315 on two sides thereof and extending in the lateral direction. The quick-release seat 199 further includes two second coupling portions 319 between the first coupling portion 317 and the assembling portion 311. The quick-release seat 199 is screwed by screws to the mounting seat 22 at a position adjacent to the first side cover 593.

The quick-release device 197 further includes a movable member 331 slidably coupled to the quick-release seat 199. The movable member 331 includes a movable coupling portion 335 on a distal end thereof. The movable member 331 further includes an ear 337 on a bottom side thereof and two sliding blocks 333 spaced from and on two sides of the ear 337. The movable member 331 can be slidably coupled with the assembling portion 311 of the quick-release seat 199. The ear 337 of the movable member 331 is received in the sliding groove 313. The two sliding blocks 333 and the two protrusions 315 can be slidably coupled. Thus, the movable member 331 can slide relative to the assembling portion 311 in the lateral direction. Furthermore, a biasing spring 339 is disposed between an end wall of the sliding groove 313 and the ear 337. The biasing spring 339 biases the movable member 331 towards the first coupling portion 317. It can be appreciated that when the movable member 331 moves in the lateral direction to compress the biasing spring 339, the spacing between the first coupling portion 317 and the movable coupling portion 335 increases.

The control device 175 includes a protective housing 177 and a control panel 178 coupled to an end of the protective housing 177. An electronic module required for operation of the door opener 20 is disposed in the protective housing 177. The door opener 20 can be operated or set through use of the control panel 178. The protective housing 177 includes two lateral sides 179 spaced from each other and a bottom side 193 extending between an end of one of the two lateral sides 179 and an end of another of the two lateral sides 179. A first side coupling slot 191 and a second side coupling slot 195 are disposed on the two lateral sides 179, respectively. The bottom side 193 includes two bottom coupling slots 192. The first and second side coupling slots 191 and 195 are symmetric to each other.

When the movable member 331 of the quick-release device 197 is biased by the biasing spring 339 to a biased position, the spacing between the first coupling portion 317 and the movable member 331 in the lateral direction is smaller than a spacing between the first and second side coupling slots 191 and 195 of the control device 175 in the lateral direction.

During installation of the control device 175, the movable member 331 is moved in a direction compressing the biasing spring 339 until the movable member 331 reaches a position in which the spacing between the first coupling portion 317 and the movable member 331 in the lateral direction is larger than the spacing between the first and second side coupling slots 191 and 195 of the control device 175 in the lateral direction. Thus, the bottom side 193 of the protective housing 177 of the control device 175 abuts against a surface of the quick-release seat 199. The two second coupling portions 319 are respectively coupled with the two bottom coupling slots 192 of the bottom side 193 of the protective housing 177, assuring the installation angle of the control device 175 is correct. Furthermore, the first coupling portion 317 is coupled with the first side coupling slot 191, and the movable member 331 is released and moves towards the first coupling portion 317. The movable coupling portion 335 of the movable member 331 is coupled with the second side coupling slot 195. Thus, the control device 175 can be positioned in the correct position. Furthermore, the control device 175 is in electrical connection with the mode switching device 592.

Thus, when it is desired to detach the control device 175, the movable member 331 can be simply moved toward the direction compressing the biasing spring 339, permitting easy detachment of the control device 175 from the quick-release device 197. Such an arrangement permits rapid assembly or detachment of the control device 175 during maintenance of the control device 175 or changing the assembling orientation of the door opener 20.

With reference to FIGS. 1, 4, 12, and 13, the door opener 20 further includes a reinforcing seat 137 coupled to the mounting seat 22. The reinforcing seat 137 can be made of a metal sheet. The reinforcing seat 137 includes four coupling pegs 139 protruding from an outer face thereof. The four coupling pegs 139 are arranged to be symmetric in the vertical direction and left/right direction.

The reinforcing seat 137 abuts against an inner face of the bottom wall 24 of the mounting seat 22 and is adjacent to an end of the second side cover 716. The reinforcing seat 137 is fixed by a plurality of screws extending through the reinforcing seat 137 and the bottom wall 24 and in threading connection with the first protrusive portion 733A of the frame 717, such that the mounting seat 22 is fixed to the frame 717 and that the reinforcing seat 137 tightly abuts against the inner face of the bottom wall 24. Furthermore, the plurality of coupling pegs 139 of the reinforcing seat 137 protrudes away from the bottom wall 24.

With reference to FIGS. 1, 2, 12, 14, and 15, the door opener 20 further includes a driving device 28 coupled with the reinforcing seat 137. The driving device 28 includes a casing 30 having four lugs 40 on an outer side thereof for respectively coupling with the four coupling pegs 139 of the reinforcing seat 137. The four lugs 40 are also arranged to be symmetric in the vertical direction and left/right direction. The casing 30 further includes a first mounting side 32 and the second mounting side 34 spaced from the first mounting side 32. The casing 30 further includes two first pivotal portions 36 and the two second pivotal portions 38. Each of the two first pivotal portions 36 is located between an associated one of the two second pivotal portions 38 and the second mounting side 34 in the lateral direction. Each of the second pivotal portions 38 is located between an associated one of the first pivotal portions 36 and the first mounting side 32 in the lateral direction.

The four lugs 40 of the casing 30 are coupled with the four coupling pegs 139, and four screws are used to threadedly coupled with the four coupling pegs 139. The casing 30 is, thus, fixed to the reinforcing seat 137. Furthermore, when the mounting seat 22 is mounted to the first protrusive wall 735A of the first protrusive portion 733A, the casing 30 is so mounted that the first mounting side 32 faces the first side cover 593, and the second mounting side 34 faces the second side cover 716.

The two first pivotal portions 36 of the casing 30 rotatably receives a first transmission member 52. The first transmission member 52 includes a first gear 58 and a second gear 60 larger than the first gear 58. The first and second gears 58 and 60 are coaxial and rotate synchronously. The first transmission member 52 further includes first and second mounting ends 54 and 56 which extend beyond the two first pivotal portions 36 and which have non-circular cross sections.

The two second pivotal portions 38 of the casing 30 rotatably receive a second transmission member 62. The second transmission member 62 includes a third gear 66 meshed with the second gear 60 and a follower gear 64 larger thane third gear 66. The follower gear 64 and the third gear 66 are coaxial and rotate synchronously. The follower gear 64 can be a bevel gear.

A cap 42 is fixed to a first mounting side 32 of the casing 30. A motor 44 is mounted to the cap 42 and includes a shaft extending into the casing 30 and jointly rotatable with a driving gear 45. The motor 44 is located between the casing 30 and the first side cover 593 in the lateral direction. The driving gear 45 can be a bevel gar and meshes with the follower gear 64. When the motor 44 operates, the driving gear 45 drives the second transmission member 62 to rotate, and the second transmission member 62 drives the first transmission member 52 to rotate.

A detection unit 68 is mounted to the casing 30 and includes a pinion meshed the second gear 60. When the second gear 60 rotates, the detection unit 68 detects operation of the motor 44 as well as the operating time of the motor 44.

A supporting sleeve 46 is disposed on the second mounting side 34 of the casing 30. The supporting sleeve 46 includes a sliding groove 48 extending in the lateral direction to an outer end face 47 of the supporting sleeve 46. The supporting sleeve 46 further includes a roller 50 spaced from the sliding groove 48. The roller 50 is at an inner side of the casing 30. The outer end face 47 of the supporting sleeve 46 is at an outer side of the casing 30.

The driving device 28 further includes a sliding member 70 slidably coupled to the supporting sleeve 46. The sliding member 70 includes a coupling portion 72 and a tail 73. The sliding member 70 further includes an abutting face 74 extending from the tail 73 to the coupling portion 72 and a rack 71 extending between the coupling portion 72 and the tail 73. The coupling portion 72 can be in the form of a hole. The sliding member 70 is slidably coupled with the sliding groove 48 of the supporting sleeve 46. The abutting face 74 abuts the roller 50. The rack 71 of the sliding member 70 meshes with the first gear 58 of the first transmission member 52, and the coupling portion 72 faces the outer end face 47. When the motor 44 operates, the sliding member 70 displaces in the lateral direction. Furthermore, since the tail 73 is free of rack, after the rack 71 of the sliding member 70 meshes with the first gear 58, the sliding member 70 can only displace within the extent of the rack 71 in the lateral direction. Namely, when the sliding member 70 displaces in the lateral direction, the rack 71 cannot disengage from the first gear 58.

The driving device 28 further includes a manual return module 77 coupled to the sliding member 70. The manual return module 77 is located between the casing 30 and the second side cover 716 in the lateral direction. The manual return module 77 includes a connecting rod 78 having an inner end 80 and an outer end 82 spaced from the inner end 80. The connecting rod 78 further includes a threaded section 86 extending from the outer end 82 towards but spaced from the inner end 80. The inner end 80 of the connecting rod 78 is coupled with the coupling portion 72 of the sliding member 70 by a locking pin 84. Thus, the connecting rod 78 and the sliding member 70 displace synchronously in the lateral direction.

The manual return module 77 further includes a fixing sleeve 88, a movable sleeve 90, and a return spring 94. The return spring 94 is mounted around the connecting rod 78. The fixing sleeve 88 is mounted around the return spring 94. An end of the fixing sleeve 88 abuts against the outer end face 47 of the supporting sleeve 46. An end of the return spring 94 abuts against the fixing sleeve 88. Namely, the end of the fixing sleeve 88 is located between the outer end face 47 of the supporting sleeve 46 and the end of the return spring 94.

The movable sleeve 90 is mounted around the return spring 94. An end of the movable sleeve 90 is at an inner side of the fixing sleeve 88. Another end of the movable sleeve 90 is abutted by another end of the return spring 94. Since an outer diameter of the movable sleeve 90 is slightly smaller than an inner diameter of the fixing sleeve 88, the movable sleeve 90 can displace in the lateral direction relative to the fixing sleeve 88. Furthermore, an inner diameter of the movable sleeve 90 is slightly larger than an outer diameter of the return spring 94, such that when the return spring 94 is compressed, the movable sleeve 90 avoids the return spring 94 from distorting.

The manual return module 77 further includes an inner tube 96 mounted between the connecting rod 78 and the return spring 94 and located adjacent to the inner end 80 of the connecting rod 78. An outer diameter of the inner tube 96 is slightly smaller than an inner diameter of the return spring 94. Thus, when the return spring 94 is compressed, the inner tube 96 cooperates with the movable sleeve 90 to assure that the return spring 94 will not distort.

The manual return module 77 includes an end cover 98, an adjusting ring 113, and an end cap 133. The end cover 98 includes two positioning grooves 111 on an end face thereof. The end cover 98 is mounted to the outer end 82 of the connecting rod 78 and abuts an end of the movable sleeve 90. The adjusting ring 113 has a non-circular outer periphery. The adjusting ring 113 further includes two receiving holes 117 corresponding to the two positioning grooves 111 and a central screw hole 115 spaced from the two receiving holes 117. Each of the two receiving holes 117 receives a positioning spring 131 and a positioning member 119. Each positioning spring 131 biases an associated positioning member 119 towards an associated positioning groove 111.

The screw hole 115 of the adjusting ring 113 is in threading connection with the threaded section 86 of the connecting rod 78, such that the adjusting ring 113 moves in the lateral direction when the adjusting ring 113 rotates. When the two receiving holes 117 are aligned with the two positioning grooves 111, the positioning members 119 are coupled with the positioning grooves 111, preventing undesired self-rotation of the adjusting ring 113.

The end cover 133 is mounted to the end face of the outer end 82 of the connecting rod 78 and is fixed to the outer end 82 of the connecting rod 78 via threading connection using a fastener 135. The end cap 133 is used to prevent the adjusting ring 113 from disengaging from the connecting rod 78 in the lateral direction when the adjusting ring 113 rotates.

The door opener 20 further includes a linkage connected between the driving device 28 and the door 737. According to an example shown in FIGS. 6, 7, and 15, the linkage is a first linkage 355 including a first push rod 357A having a first end 359A and a second end 371A. The first end 359A of the first push rod 357A has a non-circular hole. The second end 371A includes three through-holes arranged in a triangular pattern.

The first linkage 355 includes a first connecting member 373A having a first engaging end 375A associated with the first mounting end 54 of the first transmission member 52 and a second engaging end 377A associated with the second mounting end 56 of the first transmission member 52. The first engaging end 375A has a non-circular hole. The second engaging end 377A has an outer periphery matched with the non-circular hole of the first end 359A of the first push rod 357A. The second engaging end 377A of the first engaging member 373A and the first end 359A of the first push rod 357A engage with each other to rotate jointly. A screw extends through the first connecting member 373A to threadedly engage with the first mounting end 54 or the second mounting end 56 of the first transmission member 52. The first engaging portion 375A of the first connecting member 373A engages with the first mounting end 54 or the second mounting end 56 of the first transmission member 52 to rotate jointly. According to the form shown, the first engaging portion 375A of the first connecting member 373A engages with the first mounting end 54 of the first transmission member 52. Thus, the first connecting member 373A is sandwiched between the first push rod 357A and the first transmission member 52. According to the form shown in FIG. 15, the screw is in threading connection with the first mounting end 54, such that the first connecting member 373A and the first mounting end 54 are coupled together to rotate jointly. Thus, the first transmission member 52 pushes the first push rod 357A to pivot when the motor 44 operates.

The first linkage 355 further includes a guiding wheel member 379 coupled to the second end 371A. The guiding wheel member 379 includes an enlarged portion 391 and a narrower portion 392 which tapers away from the enlarged portion 391. A guiding wheel 393 is rotatably mounted on the narrower portion 392. The enlarged portion 391 of the guiding wheel member 379 is associated with the second end 371A of the first push rod 357A. In this embodiment, three screws extend through the three through-holes of the second end 371A of the first push rod 357A to be in threading connection with screw holes in the enlarged portion 391. Thus, the guiding wheel member 379 is securely coupled with the first push rod 357A.

The first linkage 355 further includes a track member 395 (see FIGS. 6, 13, and 15) mounted to an upper end of the first surface 739 of the door 737. The track member 395 includes a track 397 extending in the lateral direction. Two coupling pegs 399 extend through the second surface 751 towards but spaced from the first surface 739 of the door 737. Two bolts 511 extend through two ends of the track member 395 and threadedly engage with the two coupling pegs 399. Thus, the track member 395 is fixed to the first surface 739 of the door 737. The narrower portion 392 of the guiding wheel member 379 and the guiding wheel 393 are received in the track 397 of the track member 395.

With reference to FIGS. 1, 13, 15, and 18, the pivoting direction of the door 737 pivoting from the closed direction to the open position and the assembling direction of the door opener 20 are at the same side, such that the door opener 20 can only be mounted above the top end of the door 737, avoiding the door opener 20 from interfering with pivotal movement of the door opener 20 towards the open position. Thus, a portion of the mounting seat 22 of the door opener 20 will protrude outside of the first protrusive portion 733A. As a result, two supporting devices 153 (FIG. 4) are mounted to an outer side of the mounting seat 22 to securely fix the mounting seat 22 to the frame 717.

Each of the two supporting devices 153 includes a lining 155 in the form of a cylinder and a supporting member 159 in threading connection with the lining 155. Each lining 155 includes a screw hole 157 with an inner threading. Each supporting member 159 includes a first threaded portion 171 having an outer threading for threading connection with the screw hole 157 and a second threaded portion 173 in the form of a screw hole formed in an end face of the first threaded portion 171. Each supporting member 159 further includes a head 174 formed at an end of the first threaded portion 171 and located opposite to an open end of the second threaded portion 173 in the form of a screw hole. The first threaded portion 171 of each of the two supporting members 159 is in threading connection with the screw hole 157 of an associated one of the linings 155. When relative rotation occurs between the two supporting members 159 and the two linings 155, the two supporting members 159 move towards or away from the bottom wall 24.

Each supporting device 153 is disposed on an outer face of the bottom wall 24 of the mounting seat 22 and is located between the bottom wall 24 and the first side 719. Since the perpendicular distance between the first side 719 and the first protrusive wall 735A may change, each supporting device 153 can be used to permit relative rotation between each supporting member 159 and the associated lining 155, such that the supporting device 153 may extend or shorten to span between and abut against the bottom wall 24 of the mounting seat 22 and the first side 719 of the frame 717. In this embodiment, an end of each lining 155 abuts against the bottom wall 24 of the mounting seat 22, and the head 174 abuts against the first side 719 of the frame 717.

Each supporting device 153 further includes two fasteners 151 extending through the reinforcing seat 137 and the bottom wall 24 and in threading connection with the second threaded portions 173 of the two supporting members 159. When the two fasteners 151 are tightened while the two supporting members 159 and the two linings 155 are not rotated, the two linings 155 and the two supporting members 159 move toward the bottom wall 24, such that an end of each of the two linings 155 abuts against the wall 24. Furthermore, the head 174 of each of the two supporting member 159 abuts against the first side 719 of the frame 717. Furthermore, the lower edge 27 of the mounting seat 22 abuts against the first protrusive wall 735A of the first protrusive portion 733A, securing fixing the whole door opener 20 to the frame 717.

The door opener 20 further includes an outer cover 351 having a window 353. The outer cover 351 is fixed between the first side cover 593 and the second side cover 716. The control panel 178 of the control device 175 is located in the window 353 and is, thus, exposed.

Figure 14:
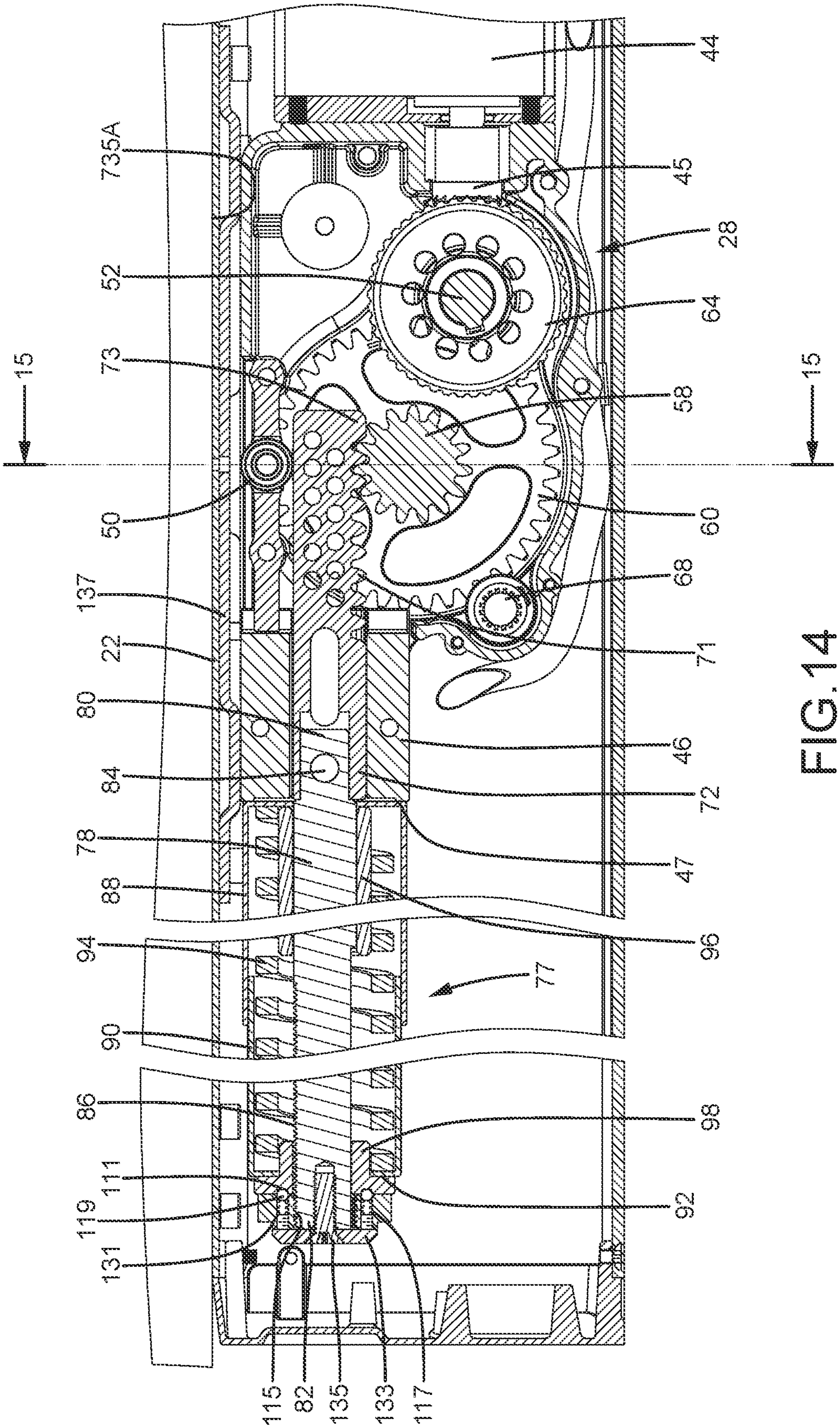
FIG. 14 is a cross sectional view taken along section line 14-14 of FIG. 13.

The structural features of the present invention and the first assembly mode thereof have been set forth. To assist in understanding the technical features of the first assembly mode of the present invention, operation of the embodiment of the present invention will be set forth in association with corresponding drawings. Firstly, it is assumed that the door 737 is in a closed position (FIGS. 8 and 13), and the mode switching device 592 is set to the ON mode. In this state, a tooth of the first gear 58 abuts against the tail 73 of the sliding member 70, the adjusting ring 113 of the manual return module 77 abuts the end cap 133, and the spacing between the abutting end 92 of the movable sleeve 90 and the outer end face 47 of the supporting sleeve 46 in the lateral direction is maximal (FIG. 14).

Figure 15:
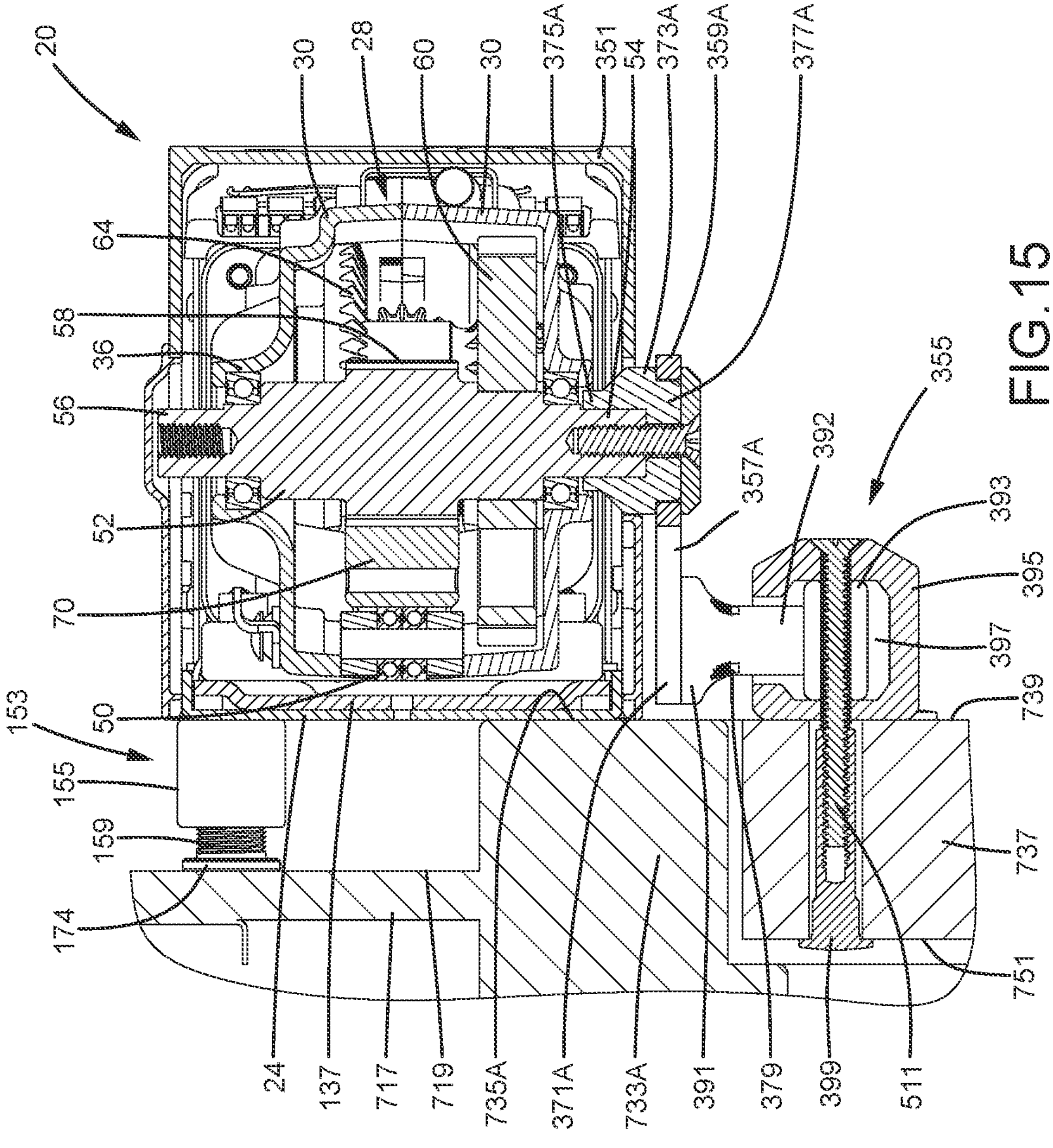
FIG. 15 is a cross sectional view taken along section line 15-15 of FIG. 14.
Figure 16:
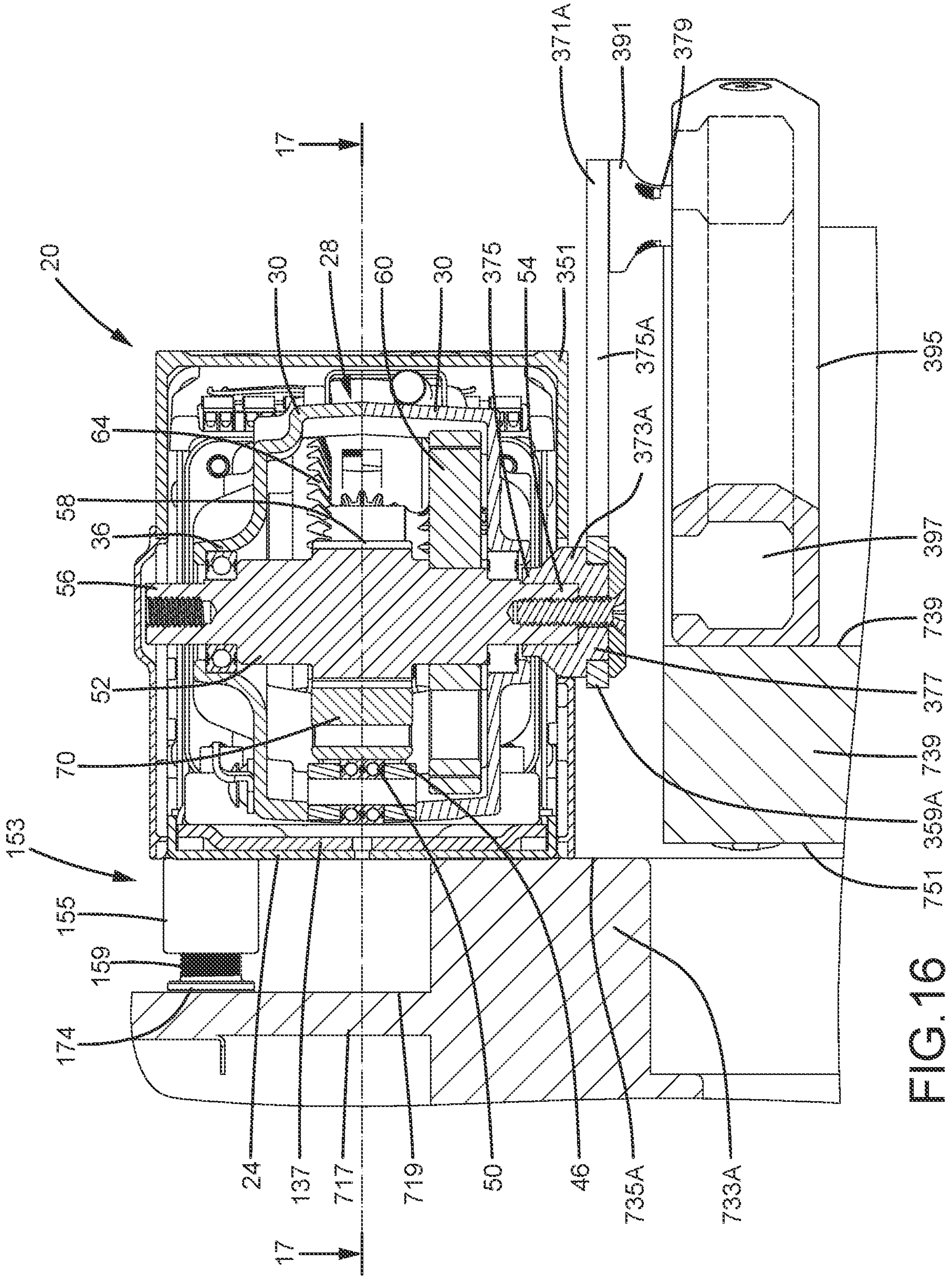
FIG. 16 is a view similar to FIG. 15 with the door moved to an open position.
Figure 17:
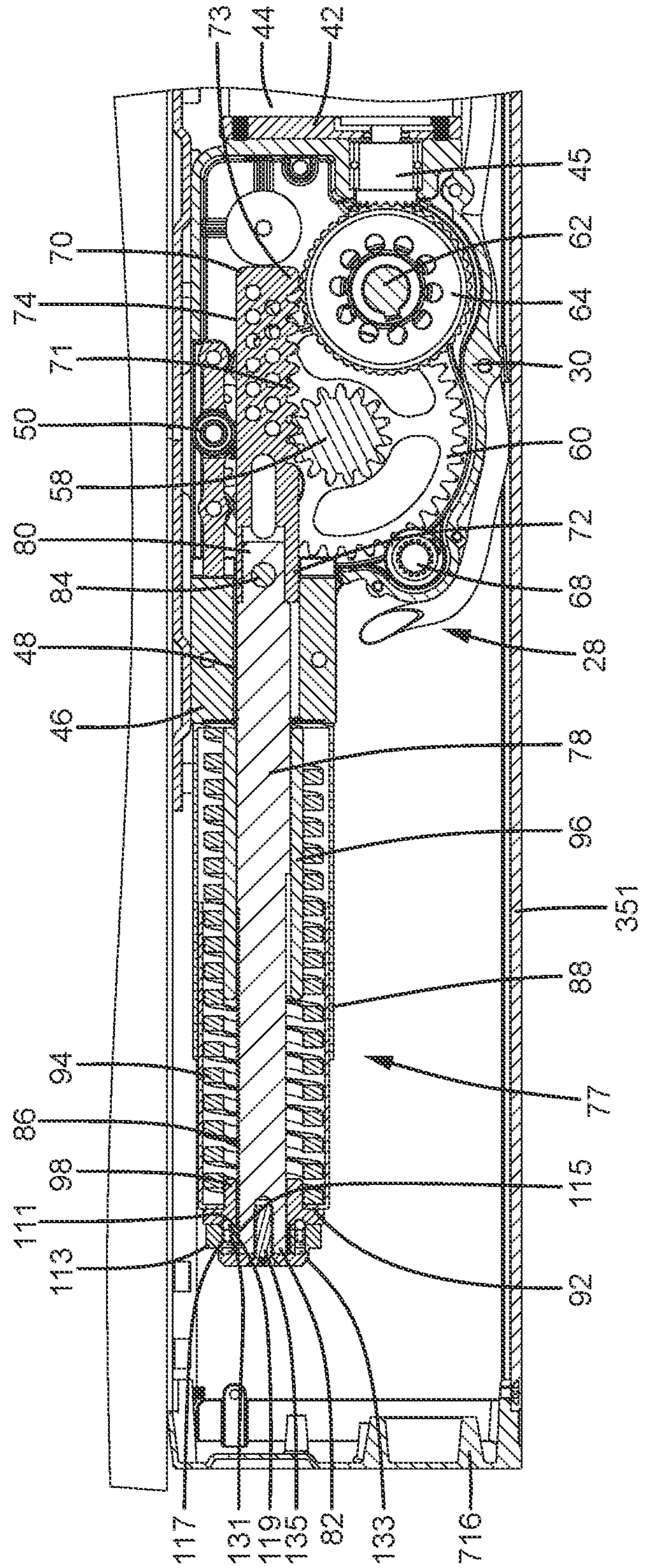
FIG. 17 is a cross sectional view taken along section line 17-17 of FIG. 16.

With reference to FIGS. 15-17, when the motor 44 operates, the driving gear 45 drives the second transmission member 62 to rotate, and the second transmission member 62 drives the first transmission member 52 to rotate. The first gear 58 of the first transmission member 52 pushes the sliding member 70 to slide in the lateral direction. Furthermore, the sliding member 70 actuate the connecting rod 78 and the end cap 133 to move in the lateral direction. Thus, the connecting rod 78 actuates the connecting ring 113 and the end cover 98 to press against the movable sleeve 90, which, in turn, moves in the lateral direction towards the supporting sleeve 46 and the first transmission member 52, and the return spring 94 is compressed by the movable sleeve 90.

Furthermore, during rotation of the first transmission member 52, the first mounting end 54 drives the first connecting member 373A to pivot, and the first connecting member 373A drives the first push rod 357A to pivot. The guiding wheel member 379 presses against the track member 395 to push the door 737 to pivot in the opening direction (see FIG. 16). The guiding wheel 393 of the guiding wheel member 379 slides along the track 397 of the track member 395.

Furthermore, when the first transmission member 52 rotates, the second gear 60 drives the gear of the detection unit 68 to rotate. Thus, the detection unit 68 can identify the operation status of the motor 44, such as the operation time or rounds. Thus, the detection unit 68 can control the opening angle of the door 737.

Given the mode switching device 592 set to the ON mode, the pivotal movement of the door 737 from the open position to the closed position is achieved by reversing operation of the motor 44. Specifically, assuming that the motor 44 rotates in a forward position to pivot the door 737 from the closed position to the open position, after a person passes through the door 737 or after a pre-determined period of time (such as a couple of seconds) has expired, the motor 44 rotates in a reverse direction to push the first connecting member 373A by the first transmission member 52. The push rod 357A actuates the guiding wheel member 379 to press against the track member 395, which, in turn, pushes the door 737 to pivot towards the closed position. The second gear 60 drives the pinion of the detection unit 68 to rotate. Thus, how long or how many turns the motor rotates for pivoting the door 737 from the open position to the closed position can be precisely detected. Furthermore, during the pivotal movement of the door 737 from the open position to the closed position, the movable sleeve 90, the end cover 98, the adjusting ring 113, and the end cap 133 move away from the supporting sleeve 46 and the first transmission member 52 in the lateral direction, such that the return spring 94 restores its length.

It can be appreciated that with the mode switching device 592 set to the ON mode, opening or closing of the door 737 is achieved through operation of the driving device 28 of the door opener 20.

When the mode switching device 592 is set to the OFF mode, only manual operation for opening the door is allowed. Specifically, with the mode switching device 592 set to the OFF mode, when a person pushes or pulls the door 737 to pivot, the track member 395 actuates the guiding wheel member 379 to pivot, and the guiding wheel member 379 actuates the first push rod 357A, which, in turn, drives the first connecting member 373A to pivot. The first connecting member 373A drives the first transmission member 52 to pivot through transmission of the first mounting end 54. The second gear 60 of the first transmission member 52 pushes the sliding member 70 to slide in the lateral direction. Thus, the connecting rod 78, the movable sleeve 90, the end cover 98, the adjusting ring 113, and the end cap 133 move together in the lateral direction towards the supporting sleeve 46 and compresses the return spring 94 (see FIG. 17).

When the person releases the door 737, the return spring 94 moves away from the abutting sleeve 46 to press against the abutting end 92 of the movable sleeve 90. Thus, the sliding member 70, the connecting rod 78, the movable sleeve 90, the end cover 98, the adjusting ring 113, and the end cap 133 move together in the lateral direction away from the abutting sleeve 46 until one of the teeth of the second gear 60 abuts against the tail 73 of the sliding member 70, and the door 737 reaches the closed position when one of the teeth of the second gear 60 abuts against the tail 73 of the sliding member 70 (FIGS. 14 and 15).

When the mode switching mode 592 switches to the hold open mode (H/O mode), the door opener 20 retains the door 737 in the open position through operation of the motor 44. Specifically, since the door 737 is in the open position, the return spring 94 of the manual return module 77 is compressed. Thus, the motor 44 must keep outputting a force when it is intended to retain the door 737 in the open position, such that the door 737 will not pivot from the open position to the open position under the action of the return spring 94. The hold open mode is suitable to retain the door 737 in the open position for a longer period of time, such as in a case for moving goods.

Note that the control panel 178 of the control device 175 of the door opener 20 is exposed to the outer side of the outer cover 351, to prevent the control panel 178 from being operated in an undesired manner, the control panel 178 is inoperable when the mode switching device 592 is set to the ON, OFF, or hold open (H/O) mode. Namely, pressing of the control panel 178 will not cause any change in operation or control of the door opener 20. When it is desired to use the control panel 178 to operate or set the door opener 20 (such as adjusting the open angle of the door 737), the mode switching device 592 is set to the wake-up mode, such that the control panel 178 is in an operable state, permitting use of the control panel 178 to operate or set the door opener 20.

Furthermore, according to the form shown, the switching between the ON, OFF, hold open, and wake up modes requires a key to unlock the anti-theft control module 599. Namely, the switching between the ON, OFF, hold open, and wake up modes can be operated only after the anti-theft control module 599 is in an unlocked state, and the control panel 178 can be operated only when the control device 175 is waken up (the wake up mode).

It is worth noting that the manual return module 77 allows adjustment of the extent of pre-compression of the return spring 94 to thereby adjust the pivoting speed of the door 737 moving from the open position to the closed position.

Figure 18:
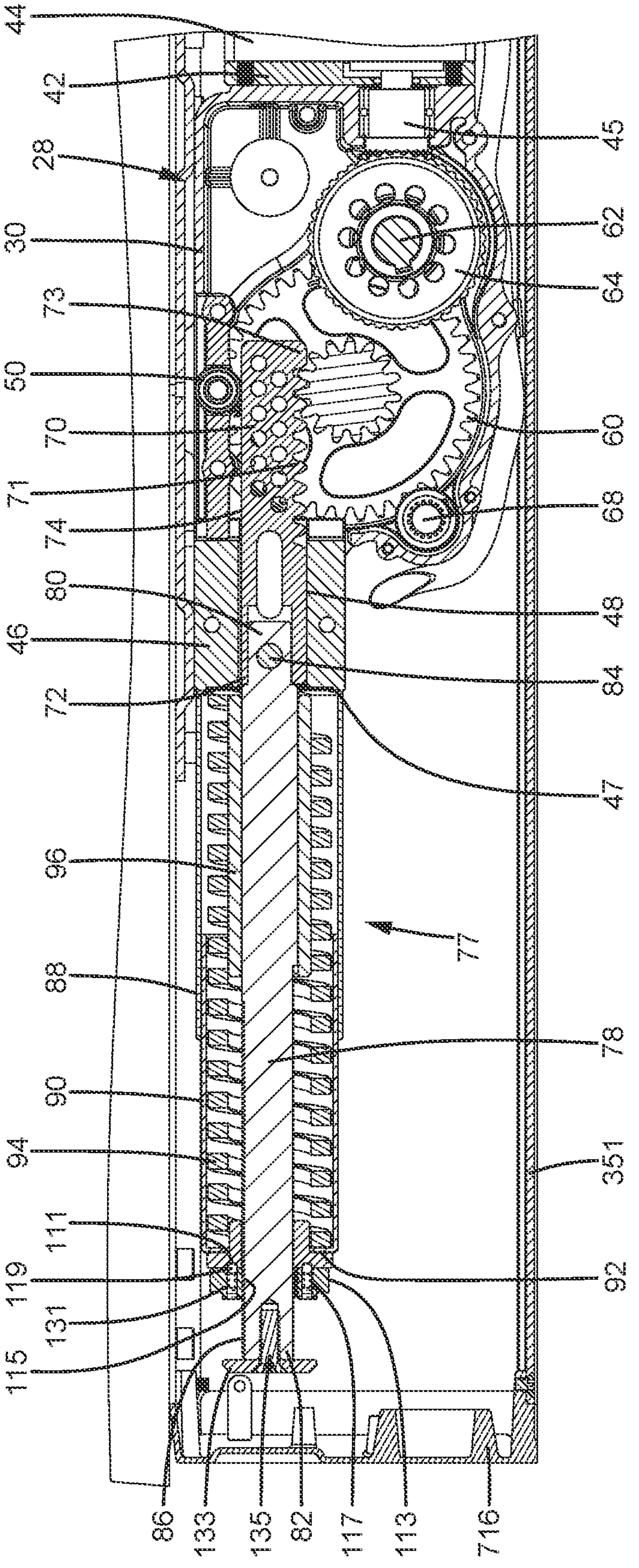
FIG. 18 is a view similar to FIG. 14 with an adjusting ring rotated to change the extent of pre-compression of a return spring.
Figure 19:
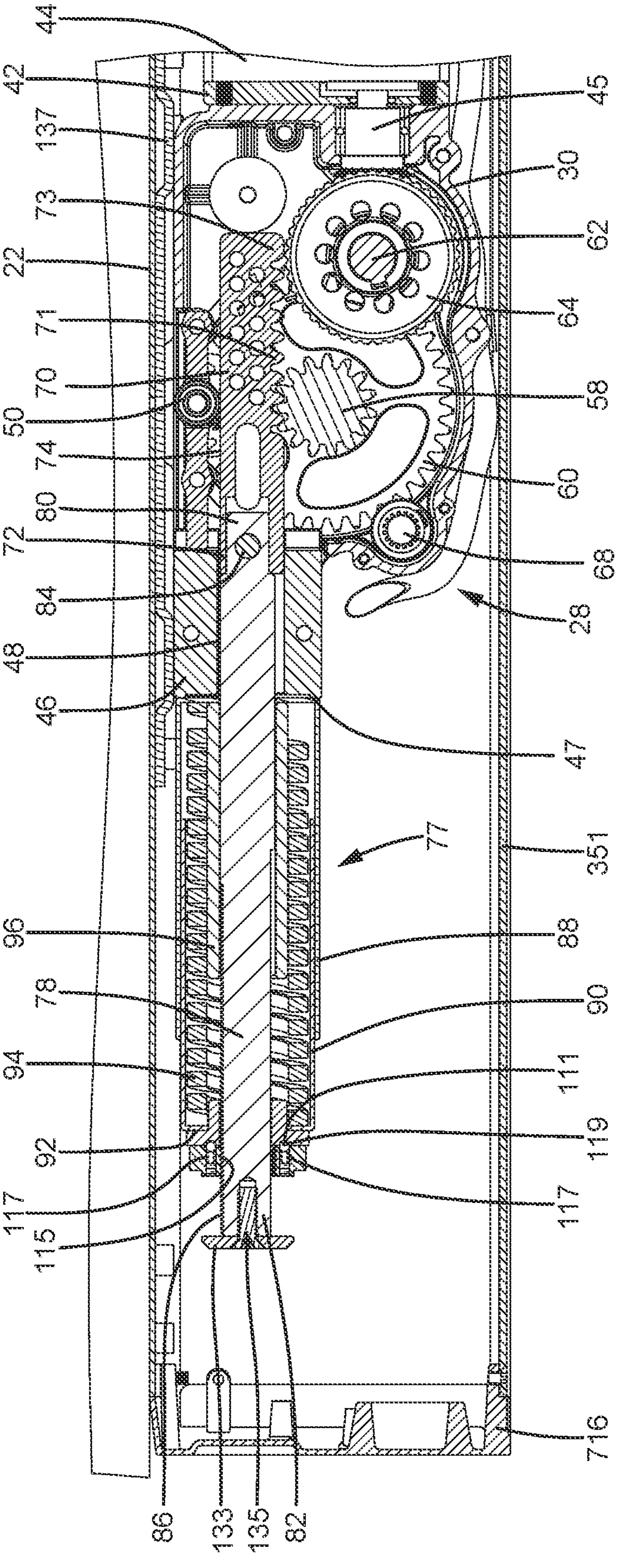
FIG. 19 is a view similar to FIG. 18 with the door being pivoted from the closed position to the open position.

Specifically, with reference to FIG. 14, the adjusting ring 113 is at the outer end 82 of the connecting rod 78. In this state, the extent of pre-compression of the return spring 94 is minimal. The length of a portion of the threaded section 86 of the connecting rod 78 outside of the movable sleeve 90 in the lateral direction is shortest. Thus, when the door 737 is manually opened, the pivotal speed of the door 737 from the open position to the closed position is slowest. With reference to FIG. 18, the rotating adjusting ring 113 moves in the lateral direction. Thus, when the adjusting ring 113 rotates, the adjusting ring 113 also moves towards the supporting sleeve 46, such that the adjusting ring 113 presses against and actuates the end cover 98 and the movable sleeve 90 to move in the lateral direction towards the supporting sleeve 46. The return spring 94 is compressed during the movement of the movable sleeve 90 in the lateral direction towards the supporting sleeve 46. Thus, the larger the extent of pre-compression of the return spring 94, the larger the length of the portion of threaded section 86 of the connecting rod 78 outside of the movable sleeve 90 in the lateral direction. Thus, the extent of pre-compression of the return spring 84 can be adjusted according to practical needs, such as the weight of the door. Furthermore, the extent of pre-compression of the return spring 94 can be judged by the length of the portion of the threaded section 86 of the connecting rod 78 outside of the movable sleeve 90 in the lateral direction.

In can be appreciated that with the return spring 94 having a larger extent of pre-compression, the return spring 94 is further compressed when the door 737 pivots from the closed position to the open position, such that the return spring 94 provides a larger elastic force for moving the movable sleeve 90 to actuate the connecting rod 78 for moving the first transmission member 52 in the reverse direction. Thus, the door 737 pivots faster from the open position to the closed position, or a heavier door can be pushed to pivot from the open position to the closed position. Furthermore, the force for retaining the door 737 in the closed position is larger when the return spring 94 has a larger extent of pre-compression.

Furthermore, after reaching a suitable position, minor adjustment of the adjusting ring 113 is carried out to couple the two positioning members 119 with the two positioning grooves 111, reliably preventing undesired rotation of the adjusting ring 113 while avoiding unpredictable change in the extent of pre-compression of the return spring 94.

Figure 20:
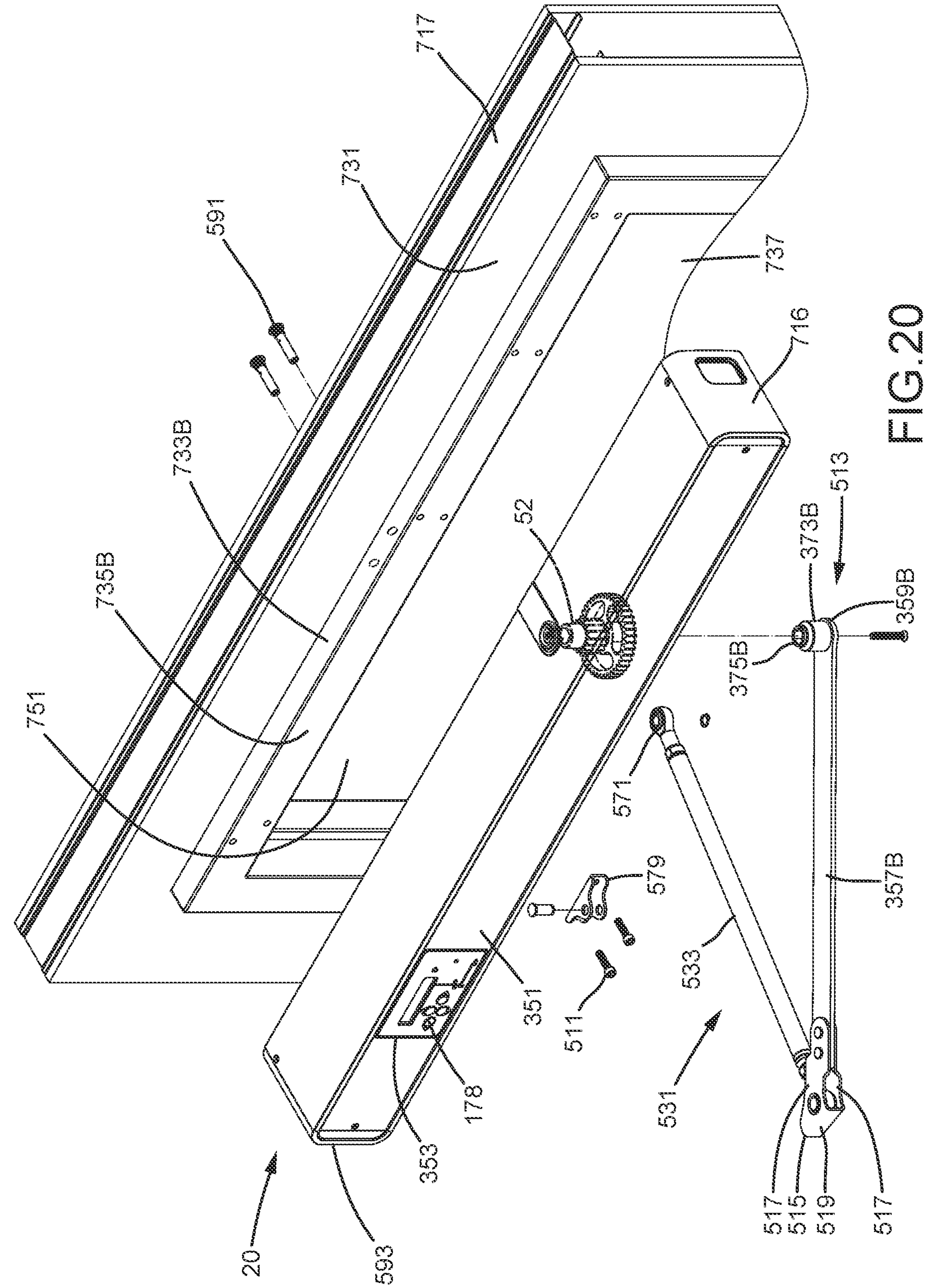
FIG. 20 is an exploded, perspective view illustrating mounting of the door opener on a second protrusive portion of the frame.
Figure 21:
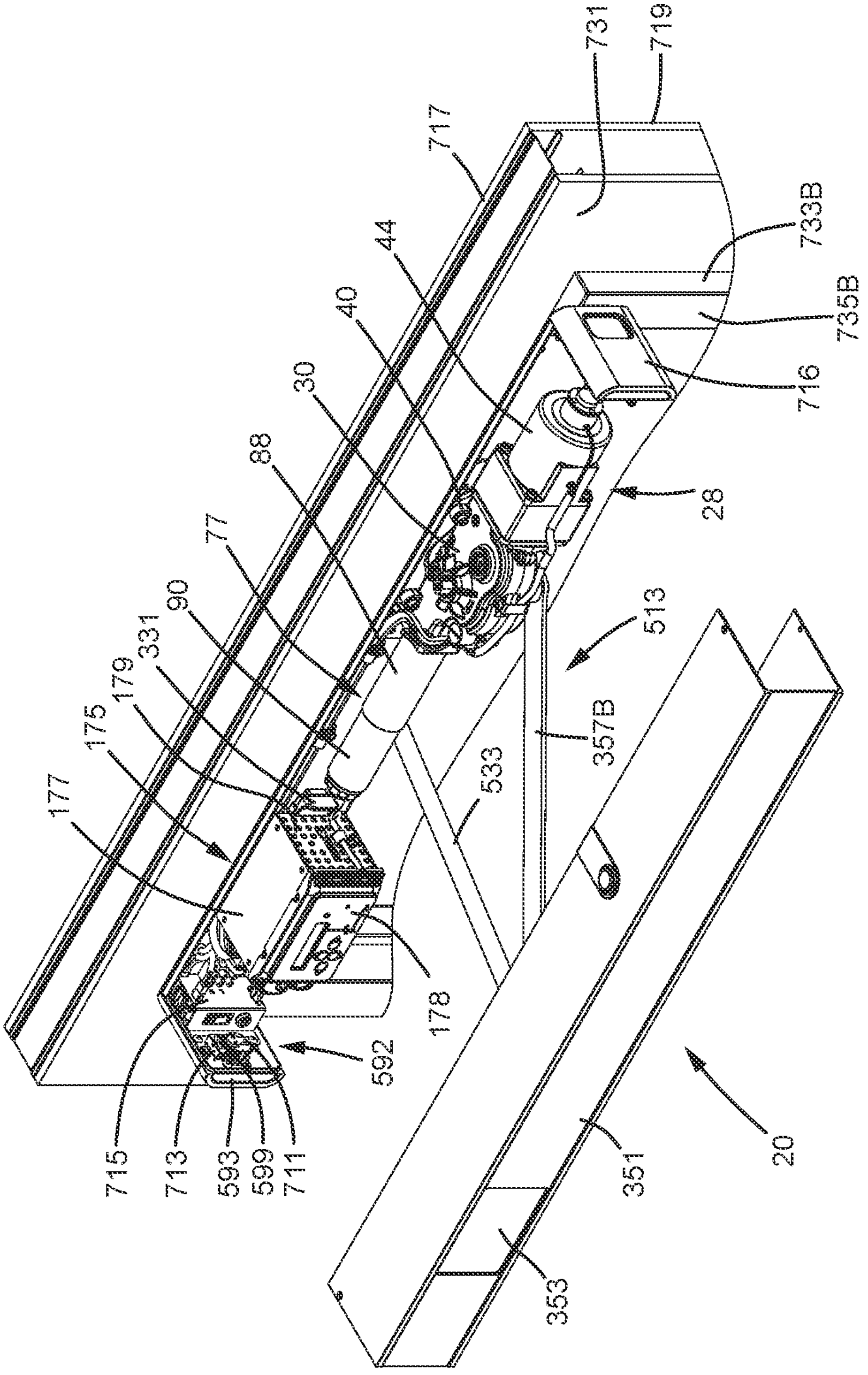
FIG. 21 is a perspective view of the door opener mounted on the second protrusive portion of the frame, illustrating a change in the assembling direction of the control device and the driving device.
Figure 22:
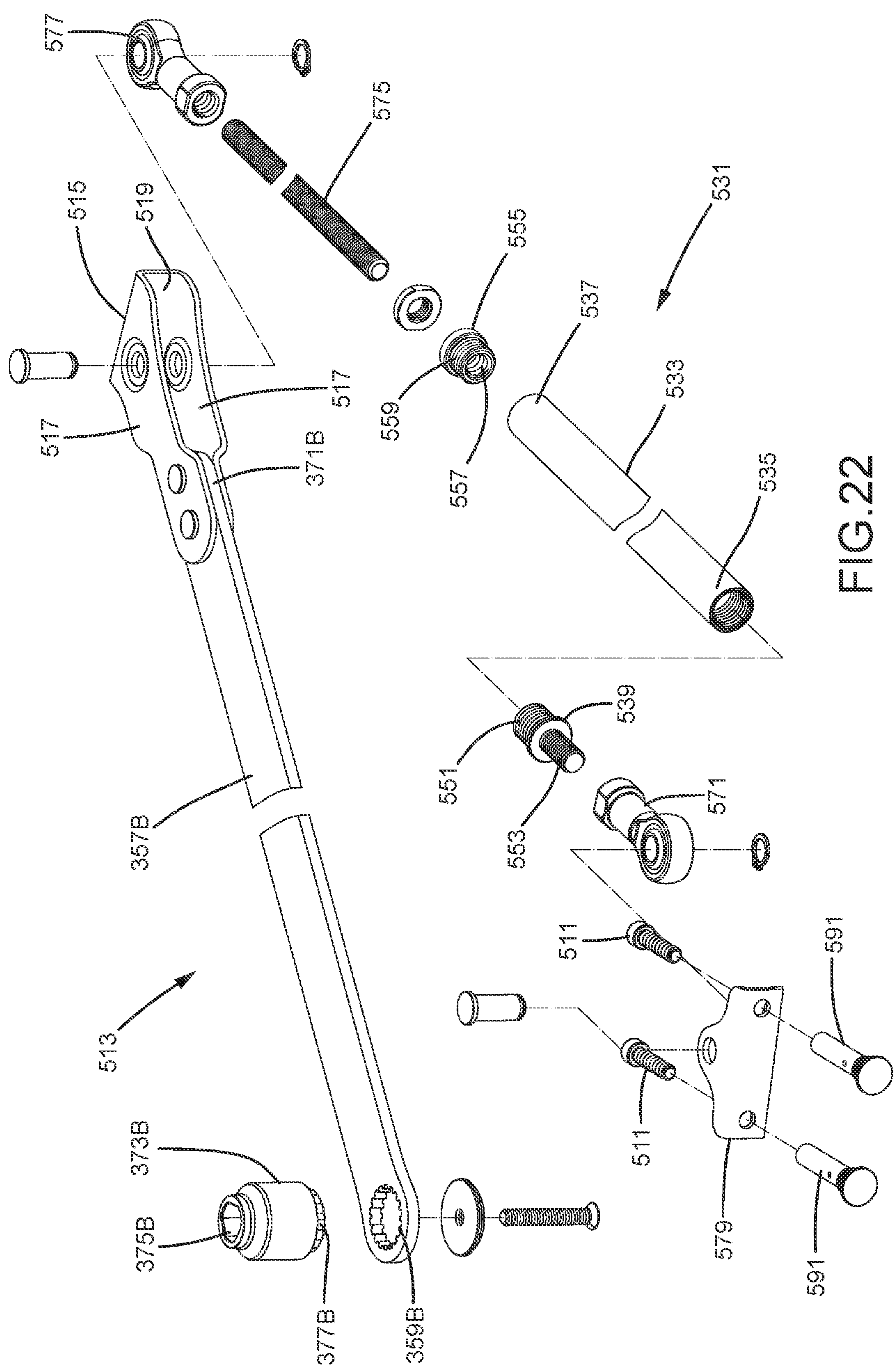
FIG. 22 is an exploded, perspective view of a second linkage used by the door opener.

In addition to the first assembly mode in which the door opener 20 is mounted to the first protrusive portion 733A at the same side as the open position of the door 737, the door opener 20 can be mounted to the second protrusive portion 733B (at the same side as the closed position of the door 737) of the frame 717, which is the second assembly mode. Specifically, the door opener 20 is pivoted 180° about a lateral axis extending in the lateral direction, and the mounting seat 22 and the frame 717 are screwed to the second protrusive portion 733B of the door opener 20. Furthermore, the change also makes the control panel 178 of the control device 175 of the door opener 20 upside down, which requires further adjustment in the assembling direction of the control device 175. This only requires simple operation including detachment of the outer cover 351 of the door opener 20 and then manually pushing the movable member 331 of the quick-release device 197 until the movable coupling portion 335 of the movable member 331 disengages from the second side coupling slot 195 of the protective housing 177 of the control device 175. Thus, the control device 175 is detached from the quick-release device 197. Next, the control device 175 is turned to couple the first side coupling slot 191 with the movable coupling portion 335 and to couple the second side coupling slot 195 with the first coupling portion 317. The two second coupling portions 319 are coupled with the two bottom coupling slots 192. As shown in FIGS. 20 and 21, the orientation of the control panel 178 is correct after mounting of the control device 175.

Figure 23:
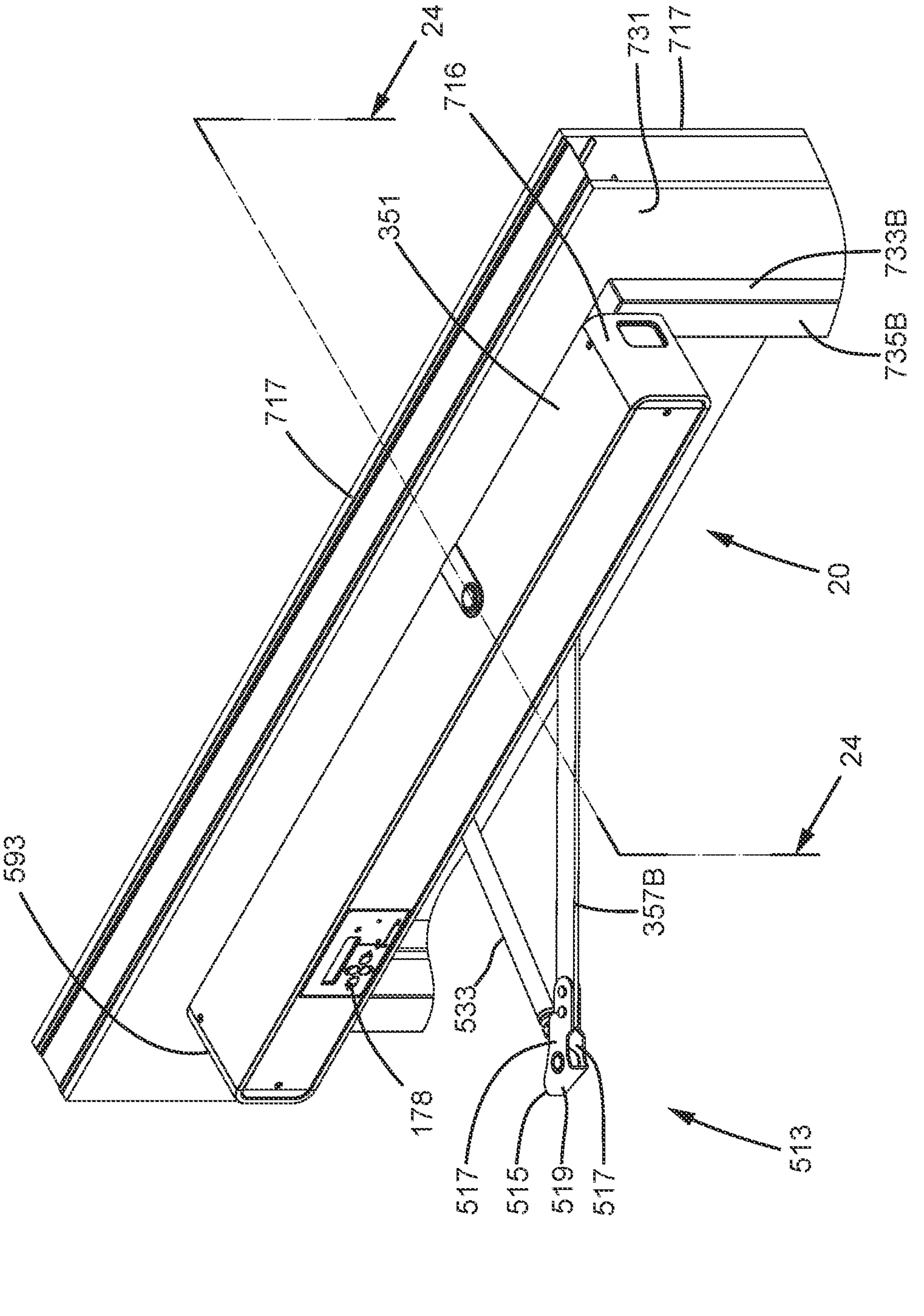
FIG. 23 is a perspective view of the door opener mounted on the second protrusive portion of the frame.
Figure 24:
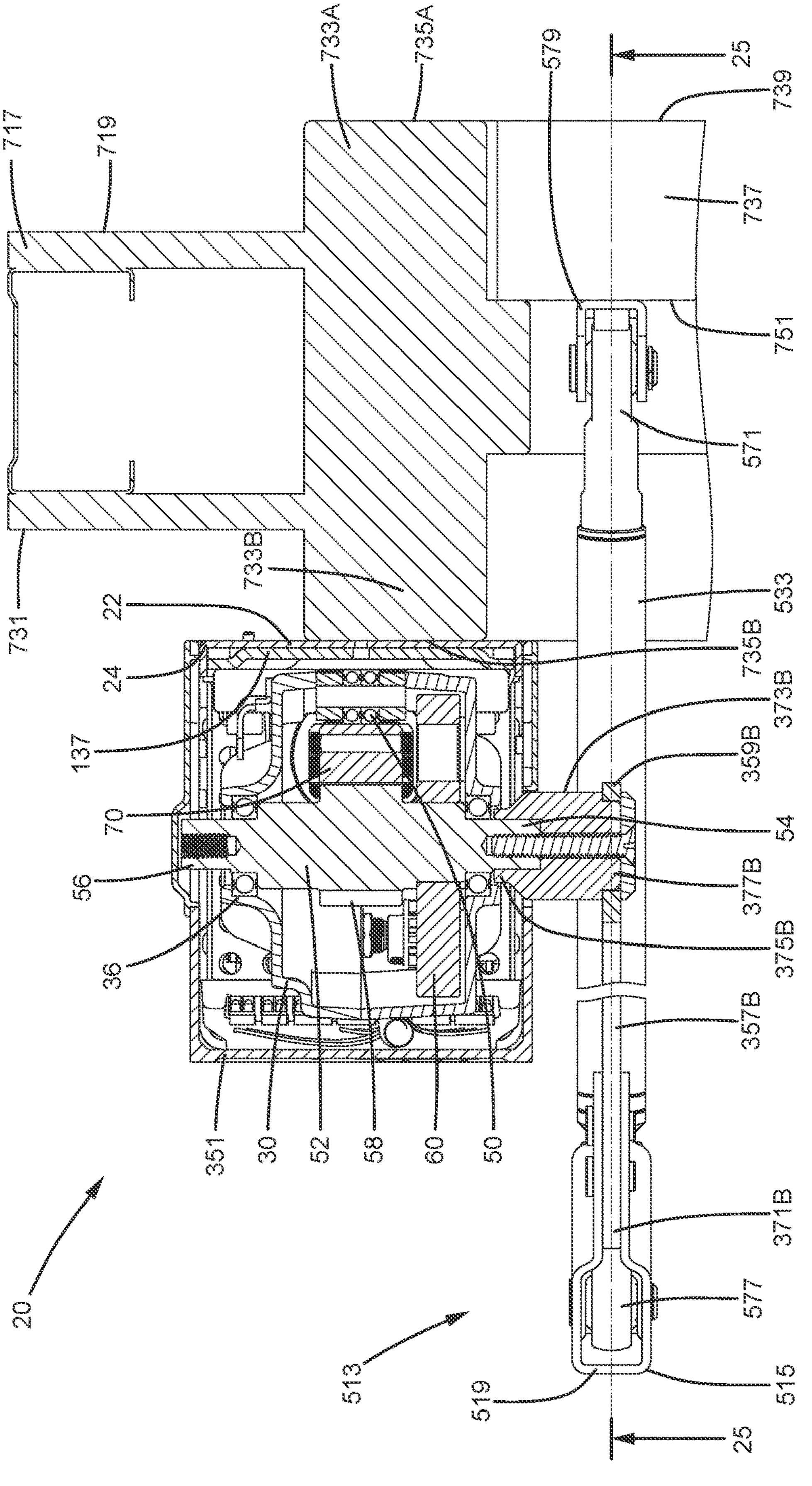
FIG. 24 is a cross sectional view taken along section line 24-24 of FIG. 23.

It is worth noting that the assembling direction of the driving device 28 can be rapidly changed according to the open side of the door 737. As shown in FIGS. 21, 23, and 24, since the door opener 20 pivots 180° about the lateral axis and since the open side of the door 737 (the door is opened from the left side or right side thereof) is not changed, the assembling direction of the driving device 28 must also be changed, such that the first mounting end 54 of the first transmission member 52 faces the ground.

The driving device 28 can be detached from the reinforcing seat 137 by removing the four screws in threading connection with the four coupling pegs 139. Then, the driving device 28 is rotated to the correct assembling direction, such that the four lugs 40 couple with the four coupling pegs 139 of the reinforcing seat 137. Next, the four screws are threadedly connected to the four coupling pegs 139 to secure the driving device 28. In this state, the driving device 28 is so assembled that the motor 44 is located between the casing 30 and the second side cover 716 in the lateral direction. Furthermore, the manual return module 77 is located between the casing 30 and the control device 175 in the lateral direction. Thus, the first mounting end 54 of the first transmission member 52 faces the ground (as shown in FIG. 24).

Figure 7:
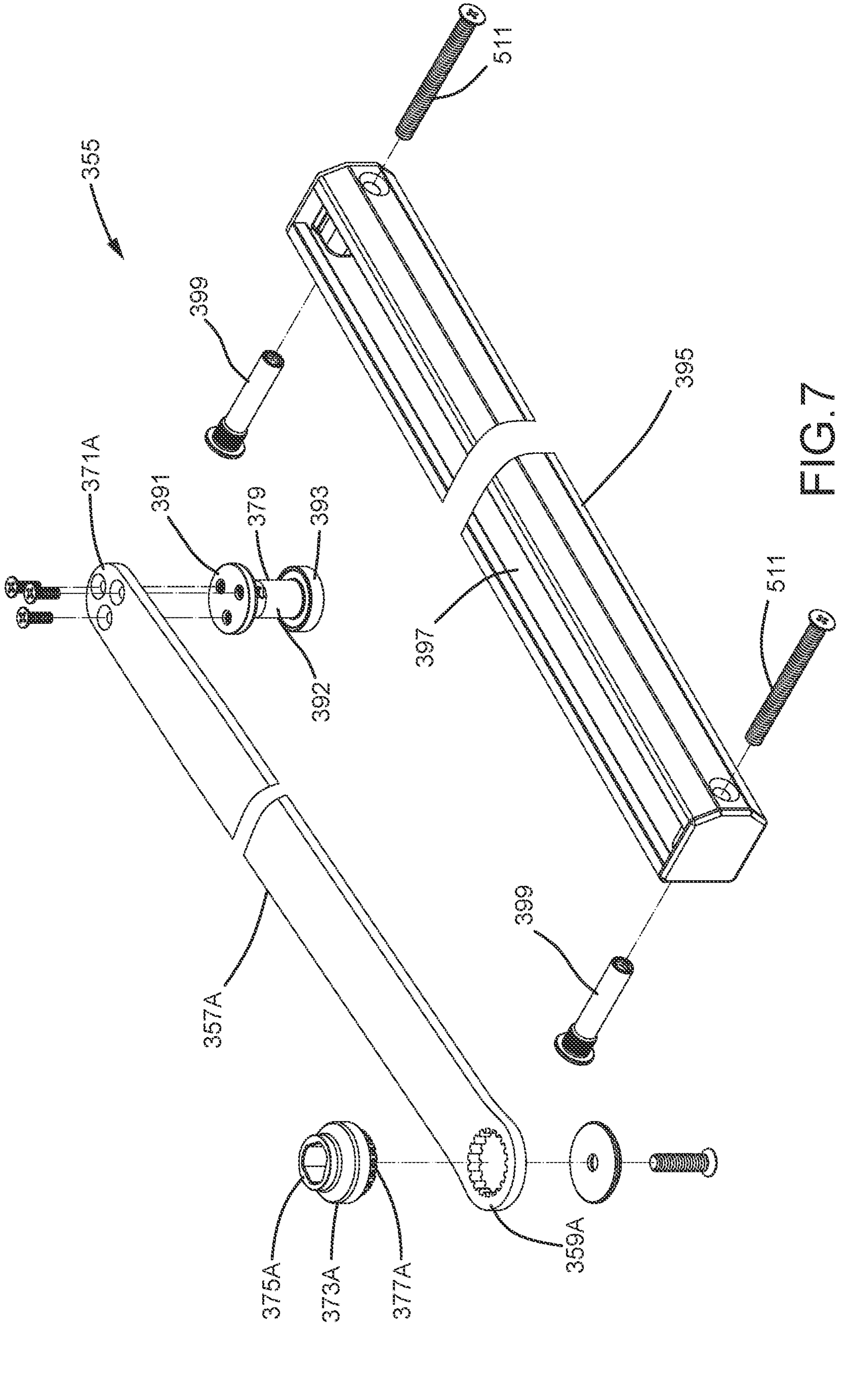
FIG. 7 is an exploded, perspective view of the first linkage.
Figure 8:
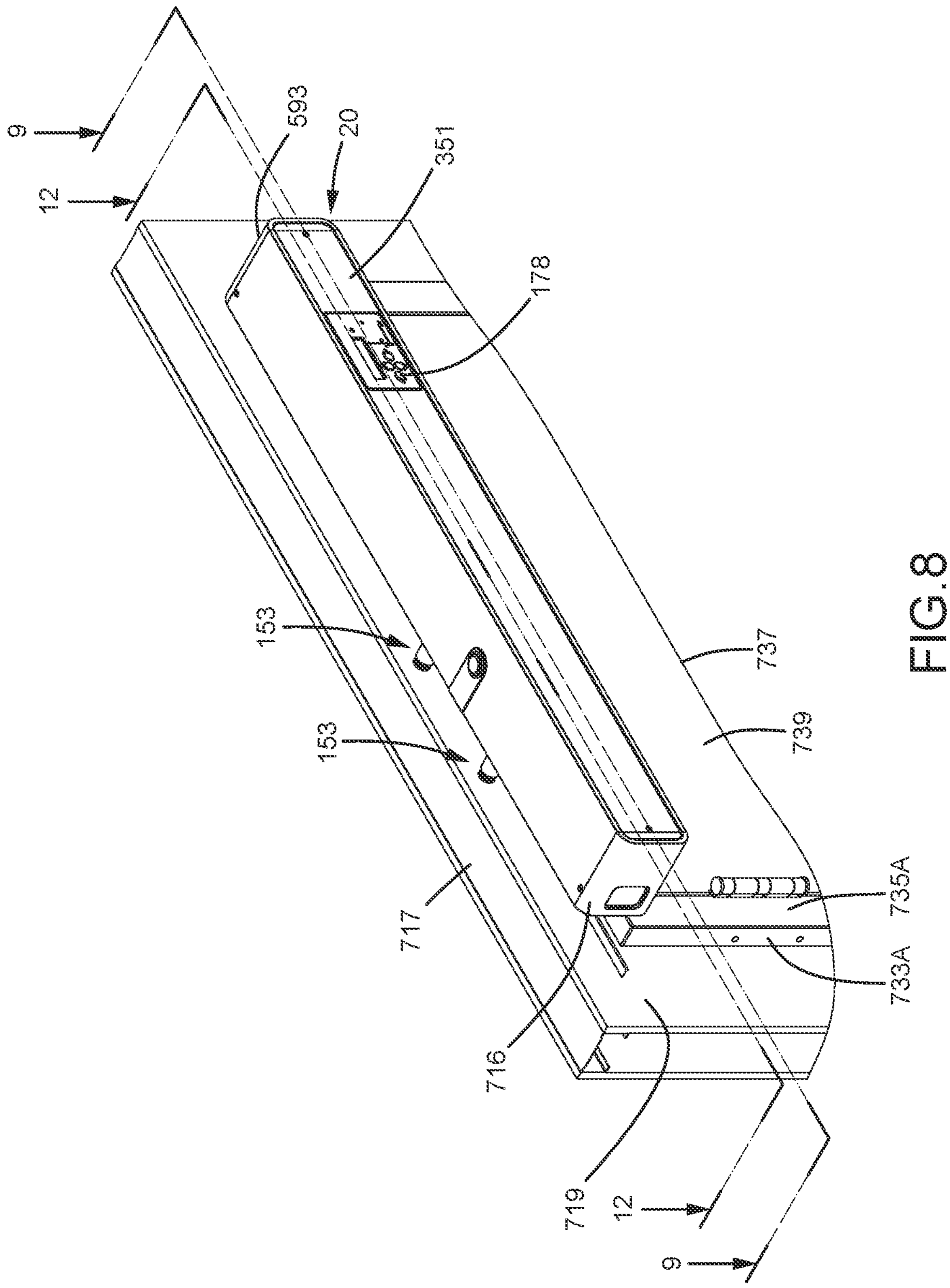
FIG. 8 is a diagrammatic perspective view illustrating mounting of the door opener of FIG. 1 to a frame.

In addition to the first linkage 355 shown in FIG. 7, the door opener 20 can use a linkage in another form. According to the form shown in FIGS. 20, 22, 24, and 25, the door opener 20 uses a second linkage 513 including a second push rod 357B having a first end 359B and a second end 371B. The first end 359B of the second push rod 357B has a non-circular hole. The second end 371B includes two through-holes spaced from each other in the length direction of the second push rod 357B.

The second linkage 513 further includes a limiting member 515 coupled with the second end 371B of the second push rod 357B. The limiting member 515 includes two coupling walls 517 symmetric to and spaced from each other and a limiting wall 519 extending between an end of one of the two coupling walls 517 and an end of another of the two coupling walls 517. The two coupling walls 517 abut against a surface of the second push rod 357B and is fixed to the second end 371B by riveting, such that the limiting member 515 cannot pivot relative to the second push rod 357B. Furthermore, the limiting wall 519 is at an angle of about 110°-135° to the length direction of the second push rod 358B.

The first end 359B of the second push rod 357B is securely connected to a second connecting member 373B. The second connecting member 373B includes a first engaging end 375B and a second engaging end 377B. The second engaging end 377B has a shape matching with the non-circular hole of the first end 359B. The second engaging end 377B of the second connecting member 373B is nonrotatably coupled to the first end 359B of the second push rod 357B. The first engaging end 375B of the second connecting member 373B is coupled with the first mounting end 54 of the first transmission member 52 to rotate jointly (see FIG. 24). Thus, when the first transmission member 52 rotates, the first transmission member 52 drives the second push rod 357B to pivot jointly.

The second linkage 513 further includes a pressing rod unit 531. The pressing rod unit 531 includes a coupling sleeve 533, a first end piece 539, and a second end piece 555. The coupling sleeve 533 includes a first outer end 535 and a second outer end 537. Each of the first outer end 535 and the second outer end 537 has an inner threading. The first end piece 539 includes a first threaded portion 551 having an outer threading and a second threaded portion 553 having an outer threading. The second end piece 555 includes an outer threaded portion 559 having an outer threading and an inner threaded portion 557 having an inner threading. The outer threaded portion 559 of the second end piece 555 is in threading connection with the second outer end 537 of the coupling sleeve 533.

The pressing rod unit 531 further includes a first pivotal member 571, a second pivotal member 577, an adjusting rod 575, and a locking member 573. The adjusting screw rod 575 has an outer threading on an outer periphery thereof and is in threading connection with the inner threaded portion 557 of the second end piece 555. An end of the adjusting screw rod 575 is outside of the coupling sleeve 533, and another end of the adjusting screw rod 575 is inside of the coupling sleeve 533. Rotation of the adjusting screw rod 575 can adjust the length of a portion of the adjusting screw rod 575 outside of the coupling sleeve 533. The locking member 573 is threadedly coupled on the adjusting screw rod 575. When the locking member 573 abuts against a surface of the second end piece 555, the adjusting screw rod 575 cannot rotate (see FIG. 25). Thus, the length of the portion of the adjusting screw rod 575 exposed outside of the coupling sleeve 533 is fixed. When the locking member 573 rotates and is, thus, spaced from the second end piece 555 (see FIG. 27), the adjusting screw rod 575 can rotate to increase or reduce the length of the portion of the adjusting screw rod 575 exposed outside of the coupling sleeve 533.

An end of the first pivotal member 571 is in threading connection with the second threaded portion 553 of the first end piece 539. An end of the second pivotal member 577 is in threading connection with an end of the adjusting screw rod 575 outside of the coupling sleeve 533. Another end of the second pivotal member 577 is pivotably disposed between the two coupling walls 517 of the limiting member 515 and is spaced from the second end 371B of the second push rod 357B.

The pressing rod unit 531 further includes a fixing member 579 and two pins 591. The fixing member 579 abuts the second surface 571 of the door 737 at a position adjacent to an upper end of the second surface 571. The two pins 591 extend from the first surface 739 of the door 737 through the door 737. Then, two bolts 511 are threadedly coupled with the two pins 591 to securely fix the fixing member 579 to the second surface 751 of the door 737. Another end of the first pivotal end 571 is pivotably connected to the fixing member 579 (see FIGS. 23-25).

When the motor 44 of the door opener 20 runs, the first transmission member 52 pushes the second push rod 357B to pivot, such that the push rod unit 531 pushes the door 737 to pivot from the closed position to open position or from the open position to the closed position. It can be appreciated that the return spring 94 of the manual return module 77 is compressed when the door 737 pivots towards the open position and that the return spring 94 restores its length when the door 737 pivots towards the closed position. When the door 737 is manually pushed open, the pressing rod unit 531 pushes the second push rod 357B to pivot, such that the first transmission member 52 pivots to actuate the manual return module 77, thereby compressing the return spring 94. Thus, after the door 737 is released, the return spring 94 returns the door 737 to the closed position.

Figure 26:
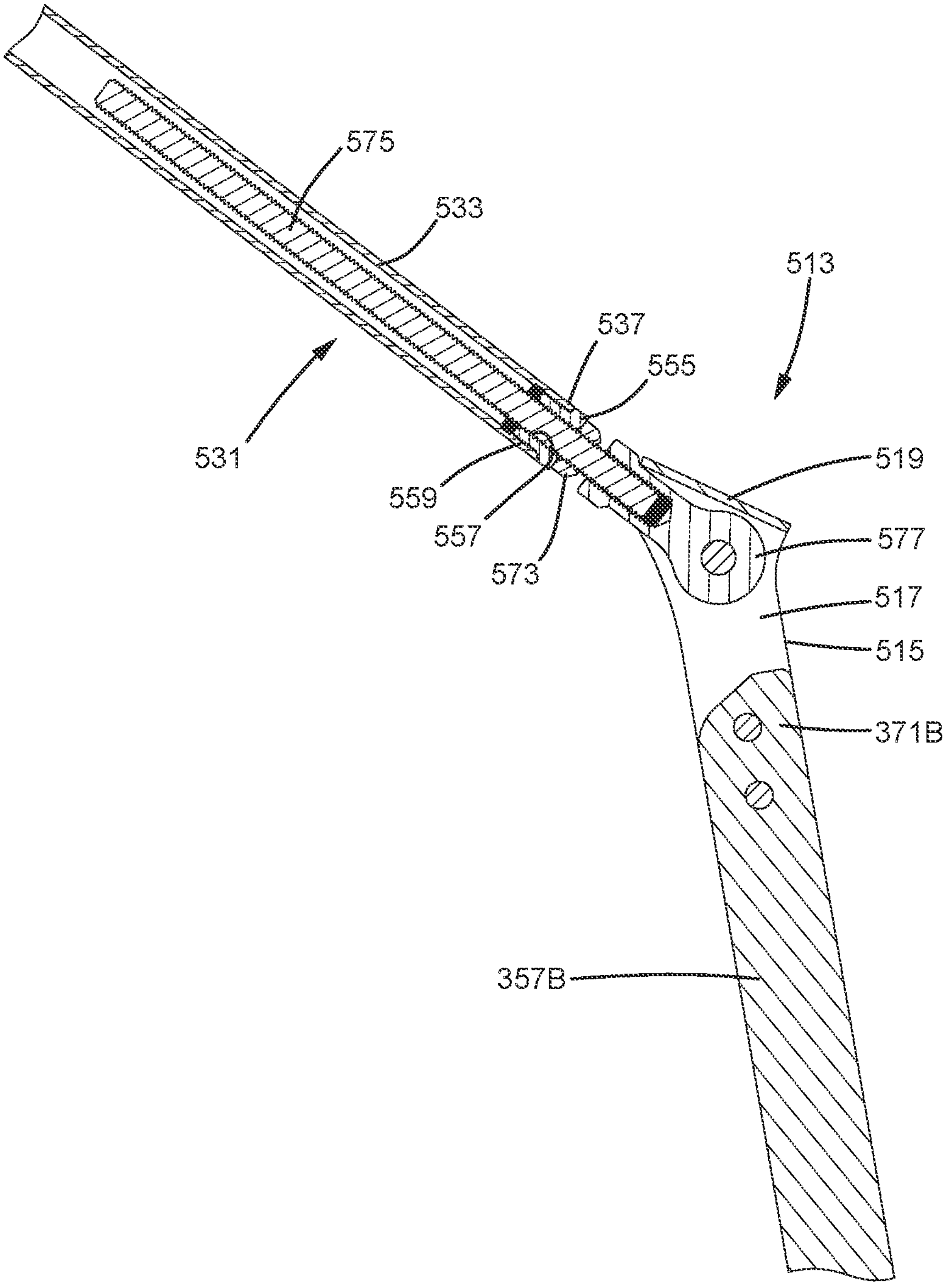
FIG. 26 is a cross sectional view illustrating a pressing rod unit of the second linkage pivoted to a position pressing against a limiting member.

The limiting wall 519 of the limiting member 515 of the second linkage 513 prevents excessive pivotal angle of the door 737. Specifically, when the door 737 pivots from the closed position towards the open position, the pressing rod unit 531 pivots relative to the limiting member 515. When the pressing rod unit 531 pivots to a position which the second pivotal member 577 abuts against the limiting wall 519 of the limiting member 515 (see FIG. 26), the door 737 cannot pivot further towards the open position. Nevertheless, the door 737 in this state can pivot towards the closed position. Thus, the limiting member 515 can prevent excessive pivotal angle of the door 737.

Figure 25:
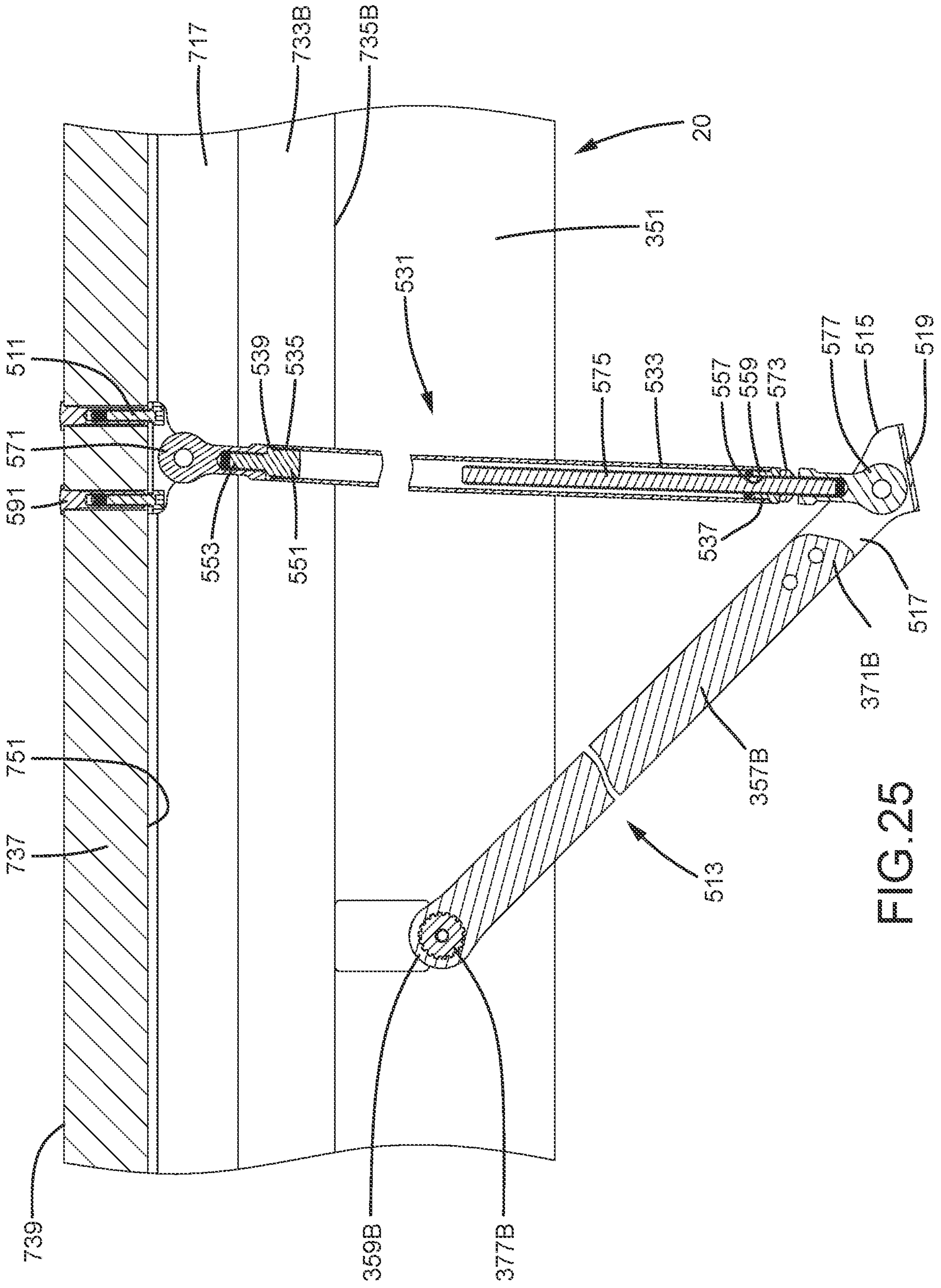
FIG. 25 is a cross sectional view taken along section line 25-25 of FIG. 24.
Figure 27:
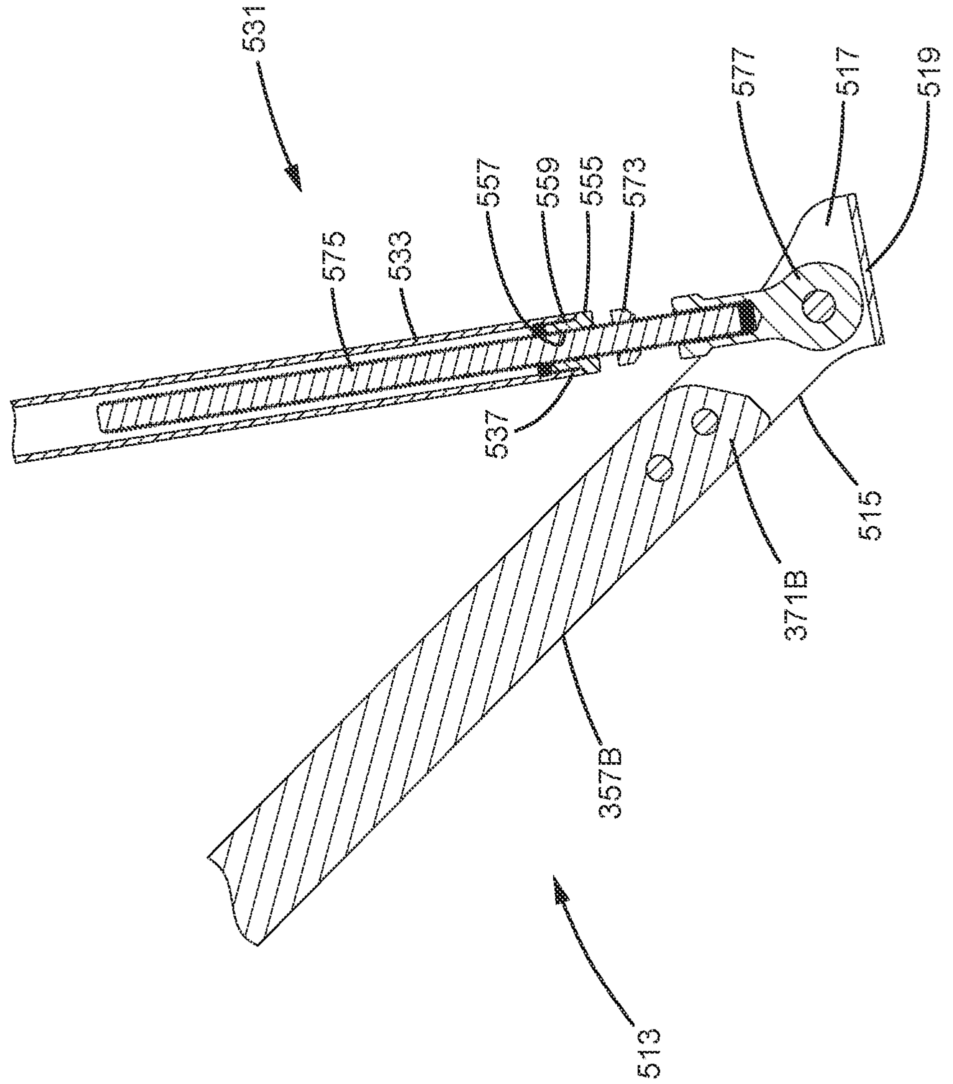
FIG. 27 is a cross sectional view illustrating an adjusting screw rod of the second linkage adjusted to a position in which a larger portion of the adjusting screw rod is exposed outside of a coupling sleeve.

The pressing rod unit 531 has a function of minor adjustment of the length to match with doors and frames of different sizes. With reference to FIGS. 25 and 27, when it is desired to adjust the pressing rod unit 531, the locking member 573 is rotated first, moving the locking member 573 away from the second end piece 555, thereby permitting rotation of the adjusting screw rod 575 to change the length of the portion of the adjusting screw rod 575 outside of the coupling sleeve 533. Thus, when the length of the portion of the adjusting screw rod 575 outside of the coupling sleeve 533 increases, the spacing between the first pivotal member 571 and the second pivotal member 577 also increases. On the other hand, when the length of the portion of the adjusting screw rod 575 outside of the coupling sleeve 533 decreases, the spacing between the first pivotal member 571 and the second pivotal member 577 is reduced.

Note that since the door opener 20 is mounted on the second protrusive portion 733B of the frame 717, the mounting position of the door opener 20 will not interference with the pivotal movement of the door 737 from the closed position to the open position. Furthermore, the mounting position of the door opener 20 on the second protrusive portion 733B can be lower than the mounting position of the first protrusive portion 733A (compare the respective mounting position of the door opener 20 in FIGS. 13 and 24). As shown in FIG. 24, when the door opener 20 is mounted to the second protrusive portion 733B, the door opener 20 will not protrude too much above the second protrusive portion 733B. This permits the door opener 20 to securely couple with the second protrusive portion 733B of the frame 717 without using the two supporting devices 153.

The reinforcing seat 137 abuts against and is securely screwed to the bottom wall 24 of the mounting seat 22 to increase the structural strength, such that the mounting seat 22 is less likely to distort and deform even though a heavier driving device 28 is disposed. Furthermore, the reinforcing seat 137 and the mounting seat 22 are in threading connection with the frame 717 by screws, providing the mounting seat 22 with excellent strength.

The four coupling pegs 139 of the reinforcing seat 137 and the four lugs 40 permits easy installation and easy change in the direction of the driving device 28. Specifically, to simply the installation, before using screws for tightening purposes, the driving device 28 can be detachably coupled through the coupling between four lugs 40 and the four coupling pegs 139. This permits a worker to extend four screws (for fixing the driving device 28) into the four coupling pegs 139 with two hands (namely, without the need of using a hand to hold the driving device 28). To permit easy change, since the four coupling pegs 139 and the lugs are arranged to be symmetric in the vertical and left/right directions, the assembling direction of the driving device 28 can be easily changed in response to the open side or the opening direction of the door 737.

The movable member 331 of the quick-release device 197 is movable in the lateral direction, such that the control device 175 can be detachably coupled to the quick-release device 197 without using screws. Furthermore, the symmetric arrangement of the first side coupling slots 191 and the second side coupling slot 195 of the protective housing 177 of the control device 175, such that the control device 197 can be rapidly assembled in the correct orientation according to the installation position of the door opener 20.

Each supporting device 153 is mounted in the gap between the mounting seat 22 and the frame 717 to reinforce the overall strength of the door opener 20 installed on the frame 717. Furthermore, the lining 155 and the supporting member 159 of each supporting device 153 can be rotated to adjust the length, so as to be applicable to frames of various sizes and shapes, thereby increasing the coupling strength between the door opener 20 and the frame 717.

Now that the basic teachings of the present invention have been explained, many extensions and variations will be obvious to one having ordinary skill in the art. For example, the manual return module 77 does not have to include the end cap 133 and the fasteners 135. In this case, the threading connection between the adjusting ring 113 and the connecting rod 78 can still avoid undesired detachment from the connecting rod 78.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A door opener comprising:

a mounting seat including a bottom wall;

a reinforcing seat fixed to the bottom wall and including a plurality of coupling pegs protruding from an outer face thereof, a driving device including a motor and a casing to which the motor is coupled, wherein the casing includes a plurality of lugs detachably coupled with the plurality of coupling pegs, wherein the driving device is configured to be operatively connected to a door for moving the door between an open position and a closed position;

a quick-release device including a quick-release seat fixed to the bottom wall, wherein the quick-release seat includes a first coupling portion, wherein the quick-release device further includes a movable member slidably coupled to the quick-release seat and slidable in a lateral direction, and wherein the movable member includes a movable coupling portion;

a control device including a protective housing and a control panel coupled to the protective housing, wherein the protective housing is detachably coupled with the first coupling portion and the movable coupling portion of the quick-release device, wherein the driving device is mounted such that the motor is located between the casing and the control device in the lateral direction, or the casing is located between the motor and the control device in the lateral direction; and an outer cover covering an outer side of the driving device and an outer side of the control device, wherein the outer cover includes a window, and wherein the control panel of the control device is located in the window.

2. The door opener as claimed in claim 1, further comprising: a supporting device having a lining and a supporting member, wherein the supporting member includes a first threaded portion and a second threaded portion, wherein the supporting device further includes a fastener, wherein the first threaded portion of the supporting member is in threading connection with lining, wherein the fastener extends through the reinforcing seat and is in threading connection with the second threaded portion of the supporting member, wherein when the supporting member rotates relative to the lining in a first direction, the supporting member moves towards the bottom wall, wherein when the supporting member rotates relative to the lining in a second direction reverse to the first direction, the supporting member moves away from the bottom wall, and wherein when the fastener is tightened while the supporting member and the lining do not rotate, the lining moves towards the bottom wall.

3. The door opener as claimed in claim 2, wherein the lining includes a screw hole, wherein the first threaded portion of the supporting member has an outer threading in threading connection with the screw hole, and wherein the second threaded portion is an inner threading.

4. The door opener as claimed in claim 1, wherein the quick-release seat further includes an assembling portion opposite to the first coupling portion in the lateral direction, wherein the assembling portion includes a sliding groove, wherein the movable member includes an ear, wherein the movable member is slidably coupled with the assembling portion, wherein the ear is received in the sliding groove, wherein a biasing spring is disposed between the ear and an end wall of the sliding groove, and wherein the biasing spring biases the movable member towards the first coupling portion.

5. The door opener as claimed in claim 1, wherein the protective housing of the control device includes two lateral sides, wherein a first side coupling groove and a second side coupling groove are disposed in the two lateral sides, respectively, wherein the first coupling portion is selectively coupled with one of the first and second side coupling grooves, and wherein the movable coupling portion is selectively coupled with another of the first and second side coupling grooves.

6. The door opener as claimed in claim 1, further comprising:

a first side cover, wherein the mounting seat further includes two ends spaced from each other in the lateral direction, and wherein the first side cover is fixed to one of the two ends of the mounting seat;

a second side cover fixed to another of the two ends of the mounting seat, wherein the outer cover is located between the first and second side covers; and a mode switching device fixed to the first side cover and in electrical connection with the control device, wherein the mode switching device includes an anti-theft control module and a switching module operable by the anti-theft control module and configured to wake up the control device, wherein when the anti-theft control module is locked, the anti-theft control module is incapable of operating the switching module, and wherein only when the anti-theft control module is unlocked, the anti-theft control module is capable of controlling the switching module to wake up the control device into an operable state.

7. The door opener as claimed in claim 1, wherein the driving device further includes:

a transmission member rotatably mounted to the casing, wherein the motor is configured to drive the transmission member to rotate; and a manual return module coupled to the casing, wherein the manual return module is operably connected to the transmission member, wherein the manual return module includes a return spring, wherein the casing is located between the manual return module and the motor in the lateral direction, and wherein the return spring is configured to push the door to pivot from the open position to the closed position.

8. The door opener as claimed in claim 7, wherein the manual return module includes a sliding member slidably coupled with the casing, wherein rotation of the transmission member causes the sliding member to move in the lateral direction, wherein the manual return module further includes a connecting rod coupled to the sliding member to permit the connecting rod and the sliding member to move jointly, wherein the connecting rod includes a threaded section, wherein the return spring is mounted around the connecting rod and has an initial length, wherein the manual return module further includes an adjusting ring in threading connection with the threaded section of the connecting rod and located outside of the casing, wherein when the transmission member does not rotate, rotation of the adjusting ring causes movement of the adjusting ring in the lateral direction to change an extent of pre-compression of the return spring, wherein when the transmission member rotates in a first direction, the connecting rod and the adjusting ring together move in the lateral direction towards the transmission member, and the return spring is compressed, and wherein when the transmission member rotates in a second direction reverse to the first direction, the connecting rod and the adjusting ring together move in the lateral direction away from the transmission member, and the return spring returns to the initial length.

9. The door opener as claimed in claim 7, wherein the plurality of coupling pegs and the plurality of lugs are arranged to be symmetric in a vertical direction.

10. A door opener comprising:

a mounting seat including a bottom wall;

a driving device including a motor, wherein the driving device is configured to be operatively connected to a door for moving the door between an open position and a closed position;

a quick-release device including a quick-release seat fixed to the bottom wall, wherein the quick-release seat includes a first coupling portion, wherein the quick-release device further includes a movable member slidably coupled to the quick-release seat and slidable in a lateral direction, and wherein the movable member includes a movable coupling portion;

a control device electrically connected to the driving device, wherein the control device includes a protective housing and a control panel coupled to the protective housing, wherein the protective housing is detachably coupled with the first coupling portion and the movable coupling portion of the quick-release device;

a first side cover, wherein the mounting seat further includes two ends spaced from each other in the lateral direction, wherein the first side cover is fixed to one of the two ends of the mounting seat;

a second side cover fixed to another of the two ends of the mounting seat;

an outer cover covering an outer side of the driving device and an outer side of the control device, wherein the outer cover includes a window, wherein the control panel of the control device is located in the window, and wherein the outer cover is located between the first side cover and the second side cover; and a mode switching device fixed to the first side cover and in electrical connection with the control device, wherein the mode switching device includes an anti-theft control module and a switching module operable by the anti-theft control module to wake up the control device, wherein when the anti-theft control module is locked, the anti-theft control module is incapable of operating the switching module, and wherein only when the anti-theft control module is unlocked, the anti-theft control module is capable of controlling the switching module to wake up the control device into an operable state.

11. The door opener as claimed in claim 10, wherein the quick-release seat further includes an assembling portion opposite to the first coupling portion in the lateral direction, wherein the assembling portion includes a sliding groove, wherein the movable member includes an ear, wherein the movable member is slidably coupled with the assembling portion, wherein the ear is received in the sliding groove, wherein a biasing spring is disposed between the ear and an end wall of the sliding roove, and wherein the biasing spring biases the movable member towards the first coupling portion.

12. The door opener as claimed in claim 10, wherein the protective housing of the control device includes two lateral sides, wherein a first side coupling groove and a second side coupling groove are disposed on the two lateral sides, respectively, wherein the first coupling portion is selectively coupled with one of the first and second side coupling grooves, and wherein the movable coupling portion is selectively coupled with another of the first and second side coupling grooves.

* * * * *